United States Patent [19]
Polydoros et al.

[11] Patent Number: 5,432,821
[45] Date of Patent: Jul. 11, 1995

[54] SYSTEM AND METHOD FOR ESTIMATING DATA SEQUENCES IN DIGITAL TRANSMISSIONS

[75] Inventors: Andreas Polydoros, Pacific Palisades, Calif.; Riccardo Raheli, Parma, Italy

[73] Assignee: University of Southern California, Los Angeles, Calif.

[21] Appl. No.: 985,004

[22] Filed: Dec. 2, 1992

[51] Int. Cl.$^6$ ............................ H03D 1/00; H04L 27/06
[52] U.S. Cl. ........................................ 375/340; 375/349
[58] Field of Search .................... 375/39, 94, 99, 102, 375/101; 371/40.1, 43

[56] References Cited

U.S. PATENT DOCUMENTS

| | | | |
|---|---|---|---|
| 5,146,475 | 9/1992 | Kubo | 375/94 |
| 5,191,598 | 3/1993 | Bäckström et al. | 375/94 |
| 5,202,903 | 4/1993 | Okanoue | 375/102 |
| 5,272,727 | 12/1993 | Okanoue | 375/94 |

OTHER PUBLICATIONS

A. Duel-Hallen, C. Heegard, "Delayed Decision-Feedback Sequence Estimation," *I.E.E.E. Transactions on Communications*, vol. 37, pp. 428–436, May 1989.

P. R. Chevillat, E. Eleftheriou, "Decoding of Trellis-Encoded Signals in the Presence of Intersymbol Interference and Noise" *I.E.E.E. Transactions on Communications*, vol. 37, pp. 669–676, Jul. 1989.

M. V. Eyeboglu, S. U. H. Qureshi, "Reduced-State Sequence Estimation with Set Partitioning and Decision Feedback,", *I.E.E.E. Transactions on Communications*, vol. 36, pp. 13–20, Jan. 1988.

A. J. MacDonald, J. B. Anderson, "PLL Synchronization for Coded Modulation," *Conf. Rec. ICC '91*, pp. 52.6.1–52.6.5, Jun. 1991.

*Primary Examiner*—Stephen Chin
*Assistant Examiner*—Don Vo
*Attorney, Agent, or Firm*—Poms, Smith, Lande & Rose

[57] ABSTRACT

A method for selecting the best survivor from a plurality of surviving possible distal data symbols creates a channel estimate for each of the survivors independent of the others. The likelihood of each survivor is then evaluated, whereupon the most likely survivor is selected. The likelihood of each survivor is computed based only on its own channel estimate. A data sequence estimation system includes a memory for storing a plurality of "surviving" sequences. For each stored survivor, the system includes a channel estimator and a metrics computer, which calculates a measure of the likelihood of the survivor as a function of the survivor itself, the observed input, and the parameters of the associated channel estimator. The system also includes a processor that accumulates the metric and selects a best survivor as a function of a computed maximum likelihood. There is no need to feed back the best survivor to update a single channel estimator, since, when the survivor has been selected, the associated channel estimator is already established.

12 Claims, 12 Drawing Sheets

SYSTEM AND METHOD FOR ESTIMATING DATA SEQUENCES IN DIGITAL TRANSMISSIONS

BACKGROUND OF INVENTION

1. Field of the Invention

This invention relates to a system and a method for estimating the parameters of a noisy or otherwise disturbed digital transmission channel and for selecting from among a plurality of possible received digital data sequences a sequence most likely to correspond to the actually transmitted sequence.

2. Description of the Related Art

Systems for transmitting digital data are becoming both more common and more sophisticated. As these systems become more widespread, so too does the problem of achieving clear reception even when the transmission channel is disturbed.

Cellular phone systems are but one example of modern digital data transmission systems and they also serve to illustrate the problems associated with such systems. Like other digital transmission systems, a cellular phone system transmits information as a sequence of data symbols or "words." Ideally, the receiver would receive this data sequence one word at a time without interference. Of course, interference is a known fact of life of digital transmission systems.

One example of a typical disturbance phenomenon is known as InterSymbol Interference (ISI), which can occur from fading, reflections, delays, etc., from the cellular phone system, which typically is moving around. Assume that the cellular transmitter has transmitted a first data word immediately followed by a second data word. The receiver may or may not receive the first data word first, but it is very likely in a typical cellular area that the receiver will also receive reflections or otherwise delayed copies (themselves possibly disturbed) of the first data word at the same time that it is receiving the second data word. In other words, one data symbol interferes with another.

The problem of ISI also arises when the receiver only samples the channel once per symbol and has a long impulse response (is narrow-band). In this case, with a long impulse response, the system has a "long memory" and may receive the "tails" of previous symbols as well as what is being transmitted instantaneously.

One should ideally be able to extract the "correct" symbol despite the presence of interference from other symbols. This goal is often frustrated by the fact that the characteristics of the transmission channel itself are either unknown or are at best poorly known. For example, it is all but impossible to know just how cellular telephone signals are being reflected, delayed, faded, and otherwise interfered with as a car is driving around in a typical modern city. Of course, if one does not know the channel, one cannot be sure that what one thinks one has received is actually what was transmitted.

There are accordingly many known methods and systems that attempt to estimate the parameters of a transmission channel in order better to reconstruct a transmitted signal. These channel estimation methods include the well-known Kalman filter and recursive least squares techniques. To estimate a channel using these systems, however, one needs to know the transmitted input signal. One way of accomplishing this is for the transmitter to send a "preamble", which is a known data sequence transmitted at set times. Since the receiver will then know exactly what was transmitted at those set times, it can compare what it received with the known values and thereby estimate the channel. In the system, data itself aids in channel estimation, hence the name "data aided estimation." The drawback of such systems, however, is that they waste bandwidth, since transmission time is taken up by data that has nothing to do with the information one wishes to transmit.

It is well known that the signal one observes can be described as the convolution of the input data with the impulse response function of the channel. Other known systems involve the technique of "equalization," which is equivalent to a deconvolution. The idea in this case is to attempt to generate a transfer function that is the inverse of the channel so that when the signal is transmitted, the inverse function and the channel's own transfer function will "cancel out."

A digital data system of this type can be viewed as a sequence of states. The problem faced by the receiver is to decide which of several possible states is the correct one, that is, the received state that one would have been received if there had been no disturbances on the channel. The estimation systems within the receiver must exclude certain states from consideration according to some procedure. The data states that have not been excluded are typically referred to as "survivors."

One goal of all estimation systems is to arrive at the "best guess" data state in the shortest possible time. The particular definition of "best" used distinguishes many systems from one another.

The well-known Viterbi Algorithm (VA) can be shown to produce the shortest path through the sequence of possible states (the "trellis"). Assuming a discrete convolution, one will then have a finite alphabet that can be transmitted. According to VA, one models the channel memory as a finite state machine. With a finite number of states, there is then a finite search time.

A known variation in VA-type systems avoids the need for a data preamble. Instead, these systems take preliminary data and use it to make a preliminary decision concerning the characteristics of the channel. One problem with this approach is that one typically needs several data samples on which to base a channel estimate, but one can typically not wait that long in order to update the estimate since the channel itself will have changed before the system's estimate is completed. One may encounter this problem any time the delay in updating an estimate is greater than the delay of the channel itself.

Another problem encountered by existing channel estimation systems, including those that use the VA, is that they generate a single, universal estimate of the channel based on the preliminary data, which is often faulty. All survivors are therefore fed by and based on the single estimator, which itself is based on the often faulty preliminary data. The likelihood of each of the "surviving" possible data sequences is then evaluated based on the single channel estimate.

A major drawback of such systems is that they can fall into a "vicious cycle": Often faulty preliminary data is used to construct the single channel estimator, against which all survivors are measured. This reduces the reliability of the survivor selection procedure so that it becomes more likely that a faulty survivor is selected as the "best." This faulty survivor is then fed back and input into the next selection cycle, which drives the estimator even further away from the correct channel model. The estimation may in this way get worse rather than better as the procedure continues.

SUMMARY OF THE INVENTION

A method for selecting the best survivor from a plurality of surviving possible digital data symbols creates a channel estimate for each of the survivors independent of the others. The likelihood of each survivor is then evaluated, whereupon the most likely survivor is selected. The likelihood of each survivor is computed based only on its own channel estimate.

A data sequence estimation system includes a memory for storing a plurality of "surviving" sequences. For each stored survivor, the system includes a channel estimator and a metrics computer, which calculates a measure of the likelihood of the survivor as a function of the survivor itself, the observed input, and the parameters of the associated channel estimator. The system also includes a processor that accumulates the metric and selects a best survivor as a function of a computed maximum likelihood. There is no need to feed back the best survivor to update a single channel estimator, since, when the survivor has been selected, the associated channel estimator is already established.

THEORETICAL BACKGROUND AND DETAILED DESCRIPTION

1. Introduction

Figure 1:
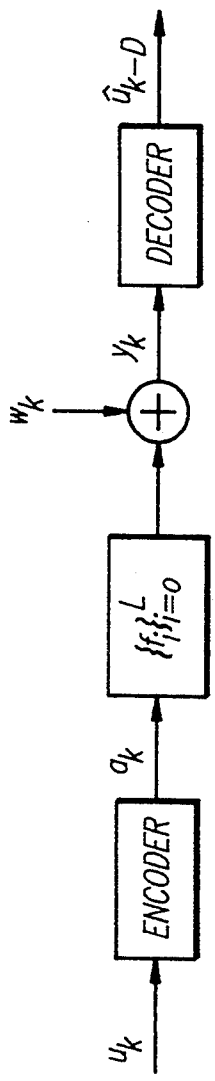
FIG. 1 illustrates a known discrete-time, white-noise equivalent of an encoder/decoder system.

The Viterbi Algorithm (VA) provides a general and computationally efficient recursive solution to the problem of maximum-likelihood estimation of a data sequence that has either undergone a coding process or has been transmitted over an InterSymbol Interference (ISI) channel, or both [1]–[3]. It is well-known that the complexity of a Viterbi decoder is proportional to the number of states in the combined ISI and code trellis [4], also called supertrellis [5]. Since the number of states increases exponentially with the channel memory, high-complexity trellis decoders would be required in most cases for a brute-force implementation of the optimal algorithm. The classic response to the task of reducing complexity has been the well-known Decision Feedback Equalization (DFE) mechanism [6], [7], which entails the truncation of the channel impulse response considered in the combined trellis and cancellation of the remaining (residual) ISI by the use of tentative decisions.

Over the last dozen years, a conceptual departure from this classic technique has been promoted which claims that considerable performance improvement may be obtained by incorporating the decision-feedback mechanism within the Viterbi decoder, as opposed to realizing it externally with the use of tentative decisions, as in classic DFE. In essence, this line of thought tries to avoid the performance cost associated with such erroneous tentative decisions. In fact, this process of incorporation is the principle of Per-Survivor Processing (PSP) in its most embryonic form, as we explain below.

The first trace of the concept seems to have appeared in [8], [9] in an effort to extend the classical structure of Maximum Likelihood Sequence Estimation (MLSE) to the case of infinite ISI channels with a particular form, namely with a pole-zero or AutoRegressive-Moving Average (ARMA) structure. Since such channels obviously cannot support a finite (non-expanding) trellis in a precise way, these early attempts introduced the PSP approximation as a means of dealing with the complexity problem by an approach different from the straightforward ISI cancellation of the DFE. The idea was simple: try to cancel the effects of residual ISI directly within the calculation of the branch metric associated with each transition in the Viterbi algorithm, based on the data sequence uniquely associated with the particular survivor leading to the starting state (of that transition). This early introduction of the concept was rather rigid in form, in that it constrained the trellis to the numerator of the ARMA model. The approach was subsequently and independently reinvented in an expanded, more flexible and general form by various authors [10]–[13]. Further extensions were proposed in [4], [5] and [14] in terms of combining channel truncation with set partitioning principles [3]. In accordance with these references, we will refer to these techniques as "Delayed Decision Feedback Sequence Estimation" (DDFSE) [12] and "Reduced State Sequence Estimation" (RSSE) [14]. The latter technique is more general in the sense that complexity reduction may be obtained not only through channel truncation but also by partial representation of the residual ISI. On the other hand, the former technique explicitly considers the case of ISI of infinite duration. Related work also appears in

[15]–[18]. A general conclusion from the aforementioned body of literature is that the effectiveness of per-survivor DFE techniques is due to a significant reduction in error propagation with respect to conventional techniques which are based on tentative decisions.

According to the invention, the idea of canceling residual ISI on the basis of the particular survivor sequence, i.e., in a per-survivor fashion, is extended to several situations, and the method according to the invention may be used whenever the branch metrics in the Viterbi algorithm are affected by some degrees of uncertainty that could be removed or reduced by data-aided estimation techniques. As an example, this situation occurs if the uncertainty is due to imperfect knowledge of some channel parameters, such as the carrier phase, timing epoch, or the channel impulse response itself. According to the invention, PSP is used as an effective alternative to the use of tentative decisions in the estimation of the unknown quantities because the negative effects of error propagation are significantly reduced. Additional advantages of the invention in the case of channel parameter estimation are: (a) the per-survivor estimator associated with the best survivor is derived from data information which can be perceived as high-quality, zero-delay decisions, thus making PSP very suitable for fast time-varying channels; and (b) since many hypothetical data sequences are simultaneously considered in the parameter estimation process, the task of blind acquisition of unknown parameters is substantially facilitated with respect to conventional techniques. (Here, "blind acquisition" means "acquisition without a training sequence.")

Furthermore, it is noted that PSP-type techniques may be applied directly to various generalizations of the VA, such as those described in [13], [25] where more than one survivor per state is retained and a list of globally best paths is available at each stage of the decoding process, or those described in [26], in which the VA provides reliability information along with data decisions. PSP techniques are also applicable to reduced complexity MLSE algorithms such as the M-algorithm [27], the (M,L) algorithm [28], or the T-algorithm [29] (see also [30]). In the interest of compactness only, these kinds of extensions are not discussed here; nonetheless, this additional flexibility of PSP techniques is worth mentioning.

This description is organized as follows: In Section 2, the system model is described and MLSE and conventional adaptive MLSE are briefly reviewed. Section 3 introduces PSP-based MLSE according to the invention in a general form. Section 4 presents a number of possible applications of PSP in approximating MLSE decoders. Specific procedures for ISI channels are proposed in the following cases: adaptive MLSE based on Mean Square Error (MSE) channel identification (Sect. 4.1); simultaneous maximum-likelihood estimation of channel and data sequence (Sect. 4.2); adaptive MLSE based on ARMA channel modeling (Sect. 4.3); and adaptive Whitened Matched Filter (WMF) (Sect. 4.4). In the case of non-ISI channels, a specific PSP method for joint Trellis-Coded Modulation (TCM) decoding and phase synchronization (Sect. 4.5) is described. An analysis of the performance of the methods according to the invention is presented in Section 5, while simulation and numerical results are given in Section 6. Conclusions are drawn in Section 7.

2. System model

In this section, we briefly review MLSE for coded signal transmission over ISI channels and introduce the notation. A source symbol $u_k$ feeds a TCM encoder every T seconds. An encoded complex symbol $a_k$, belonging to an M-ary alphabet, is transmitted over a complex linear channel characterized by impulse response h(t) (this filter represents the cascade of the transmitter filter and the physical channel). The received signal is $$r(t) = \sum_{k=-\infty}^{\infty} a_k \cdot h(t - kT) + n(t) \quad (1)$$

wherein the complex noise process n(t) is white with per-component power spectrum $N_0$, Gaussian, and independent of the data sequence. Under the assumption that h(t) is known, the optimum receiver is composed of a filter matched to the pulse h(t) followed by a symbol rate sampler and a MLSE decoder. In a classic arrangement [2], the aforementioned matched filter is augmented to a Whitened Matched Filter (WMF) followed by the symbol rate sampler [2], with the result that the sampled noise sequence is white and a standard Viterbi decoder can be used. Although other realizations are possible [32], this is the model employed in the following. According to it, a discrete-time white-noise equivalent of the overall transmitter/channel/WMF/sampler cascade completely characterizes the system that precedes the Viterbi decoder [2], as shown in FIG. 1. Denoting by $\{f_i\}_{i=0}^{L}$ the impulse response of this equivalent channel, where L represents the channel memory, the signal at the input of the decoder may be written as $$y_k = \sum_{i=0}^{L} f_i \cdot a_{k-i} + w_k \quad (2)$$

in which the discrete-time noise process $w_k$ is white, Gaussian, zero-mean, independent of the data sequence, with independent real and imaginary components of variance $\sigma^2 = N_0$. By selecting a canonical WMF [2], the resulting discrete-time equivalent channel is minimum phase, or, at most, has system zeros on the unit circle. Although this requirement is not necessary in the case of MLSE,[2] it constitutes the optimum choice for RSSE [5], [11].

[2]However, the decoding delay is indeed minimum if, among the various possibilities, this WMF is used.

Adopting a finite state machine description for the cascade of encoder and channel, a combined code and ISI trellis diagram may be introduced, with a state $\mu_k$ defined as [4], [5]

$$\mu_k = \begin{cases} \sigma_k & L = 0 \\ (\sigma_k; a_{k-1}, a_{k-2}, \ldots, a_{k-L}) & L \geq 1 \end{cases} \quad (3)$$

in which $\sigma_k$ is the encoder state and the L-tuple $(a_{k-1}, a_{k-2}, \ldots, a_{k-L})$ represents the channel state. In the case of two-dimensional trellis codes, the number of states in the combined code and ISI trellis is $S(M/2)^L$, where S is the number of states in the code trellis. The source sequence may be decoded by means of a Viterbi algorithm operating on the observed signal $y_k$. Assuming $L \geq 1$, the branch metrics at the k-th step, are evaluated for all possible state transitions according to $$\lambda_{k+1}(\xi_{k+1}) = |y_k - x_k(\xi_{k+1})|^2 \qquad (4)$$

in which $\xi_{k+1}$ denote the transitions $\mu_k \to \mu_{k+1}$ and $$x_k(\xi_{k+1}) = \sum_{i=0}^{L} f_i \cdot a_{k-i}(\xi_{k+1}) \qquad (5)$$

denote the noiseless signals at the channel output associated with the state transitions $\xi_{k+1}$. In the absence of ISI (L=0), associated with the state transition $\xi_{k+1}$ there is a symbol subset, which we denote as $A_k(\xi_{k+1})$.[3] The TCM-encoded noise-corrupted signal $y_k$ is used to compute the branch metrics according to $$\lambda_{k+1}(\xi_{k+1}) = \min_{a_k \in A_k(\xi_{k+1})} |y_k - f_0 a_k|^2 \qquad (6)$$

The method proceeds as follows: For all successor states $\mu_{k+1}$, the accumulated metrics $\Gamma_{k+1}(\mu_{k+1})$ are determined by performing a minimization over the current states $\mu_k$ $$\Gamma_{k+1}(\mu_{k+1}) = \min_{\mu_k}[\Gamma_k(\mu_k) + \lambda_{k+1}[\xi_{k+1}(\mu_k, \mu_{k+1})]] \qquad (7)$$

where we have emphasized the dependence of the transition $\xi_{k+1}$ on the current and successor states. Finally, the survivors terminating in the current states, denoted by $p_k(\mu_k) = (\mu_0, \mu_1, \ldots, \mu_k)^T$, are extended by incorporating the transitions that satisfy (7) according to[4]

$$p_{k+1}(\mu_{k+1}) = (p_k^T(\mu_k) : \mu_{k+1})^T \qquad (8)$$

Similarly, the survivor source sequences, denoted by $u_k(\mu_k) = (u_0, u_1, \ldots, u_{k-1})^T$ are extended according to $$u_{k+1}(\mu_{k+1}) = (u_k^T(\mu_k) : u_k(\xi_{k+1}))^T \qquad (9)$$

over the transitions that satisfy (7). If L=0, among the source symbols associated to the subset $A_k(\xi_{k+1})$, the symbol corresponding to the minimizing coded symbol in (6) is selected.

[3] In the literature, this situation is typically described in terms of 'parallel transitions' between pair of states. In RSSE, parallel transitions are also possible.
[4] The symbol $[.]^T$ denotes vector or matrix transposition.

Figure 2:
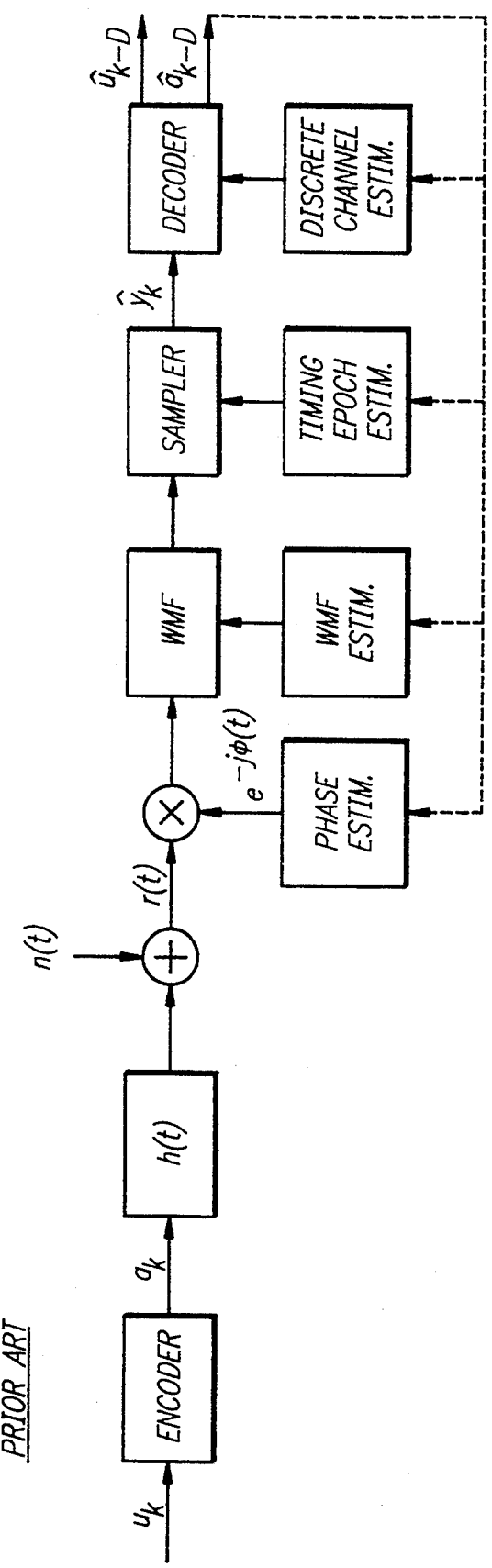
FIG. 2 illustrates a conventional maximum likelihood sequence estimation (MLSE) system with unknown channel parameters.

Assume now that a set of channel parameters is not known to the receiver. In a general case, this set might include the timing epoch, the carrier phase, and the coefficients of the sampled channel impulse response. In the standard approach to the approximation of MLSE receivers, the unknown channel parameters are estimated, often using data-aided estimation techniques [3], [4], [6], and subsequently used in data decoding. For example, the channel estimation process may be indirectly performed by estimating (a) the WMF response, (b) the timing epoch used in symbol rate sampling, and (c) the discrete-time overall channel. For passband signaling, the carrier phase should also be estimated at the receiver.[5] FIG. 2 shows the general block diagram of adaptive MLSE receivers for unknown channels. In this figure, the decoder outputs the estimated source sequence $\mu_{k-D}$ with a decoding delay of D symbol intervals[6] and a tentatively estimated encoded sequence $a_{k-d}$, with a moderate delay of $d << D$ symbols, used for channel parameter estimation. Typically, d takes on values from 0 (zero-delay tentative decisions) to a few units. Note that the signal at the input of the decoder $y_k$ is now an approximation of the observed signal $\tilde{y}_k$ of FIG. 1. In FIGS. 1 and 2, the decoder could be based on the standard VA or implement a reduced complexity approximation of the VA as in RSSE or other types of algorithms [27]–[29].

[5] Some of these parameters are in principle related to each other. As an example, the carrier phase could be incorporated into the WMF response or the discrete channel coefficients by a proper rotation in the complex plane. Similarly, the discrete channel and the WMF response are the solution to a set of equations, for a given channel response h(t) [33], [34].
[6] We do not consider the physical delay introduced by a causal approximation of the WMF, which is anticausal in theory.

3. Per-Survivor Processing

Now assume that the branch metric $\lambda_k(\xi_{k+1})$ is not perfectly known, given the state transition. This lack of precise knowledge might be due to the presence of unknown channel parameters, an undesired situation as far as the receiver is concerned, or due to a desire to operate with a reduced-complexity trellis, a deliberate reduction in decoding accuracy. More specifically, either the signal $y_k$ of (2) that would be observed in an ideal situation by the decoder (ideal meaning "with all parameters known, except for the data"), or the noiseless signals $x_k(\xi_{k+1})$, or both, could turn out to be partially unknown quantities. As a first example, both quantities are partially unknown if the actual channel impulse response h(t) is unknown. In fact, in this case, both the WMF and the discrete-time equivalent channel response are unknown (or, possibly, time-varying). In the case of RSSE, the signal $y_k$ is actually observable (hence, known), whereas some uncertainty manifests itself in the noiseless signals $x_k(\xi_{k+1})$ due to the presence of residual ISI. This uncertainty must somehow be removed before proceeding with VA decoding. As a last example, suppose that the channel is known but the timing epoch and/or carrier phase are unknown. In this case, only an approximation $\tilde{y}_k$ of the signal $y_k$ is available for decoding, while the noiseless signals are perfectly known.

Assume further that the various unknown quantities can be estimated using some form of data-aided estimation techniques. If proper data-aided estimates of the unknown quantities are available, they can be used to approximate the MLSE algorithm (4)–(7). The classical route to such an approximation is based on the use of preliminary data decisions in the so-called "decision-directed mode", in order to provide for the data-aiding in the parameter estimation process. This approach has been used in many adaptive realizations of MLSE (see, for example [3], [4], [6]). It was also used in early attempts to reduce the number of the decoder states by DFE mechanisms [7]. Its main drawback is the presence of decoding errors in the preliminary sequence used for estimating the unknown quantities. These decoding errors negatively affect the estimation process with the result that error propagation might take place. Furthermore, the quality of the tentative decoded sequence depends on the decoding delay—a larger delay improves the quality of the data-aiding sequence although, in many situations, it results in an unacceptable delay in the estimation process [3].

In order to formalize the above considerations, let us denote the unknown parameters as a vector $\theta$ and the sequence of tentative decisions with delay d as the vector $$\hat{s}_{k-d} = (\hat{a}_0, \hat{a}_1, \ldots, \hat{a}_{k-d-1})^T \quad (10)$$

We also denote a data-aided estimate of $\theta$ based on the sequence (10) as $$\hat{\theta}_{k-d} = g(\hat{s}_{k-d}) \quad (11)$$

in which, g(.) represents the data-aided estimator. The aforementioned classical approach can be formalized using this notation by replacing the branch metrics (4) with $$\lambda_{k+1}(\xi_{k+1}) = |\tilde{y}_k(\hat{\theta}_{k-d}) - \tilde{x}_k(\xi_{k+1}, \hat{\theta}_{k-d})|^2 \quad (12)$$

in which, we have denoted by $\tilde{y}_k(\hat{\theta}_{k-d})$ an approximation of $y_k$ when the estimated parameter vector is $\hat{\theta}_{k-d}$, and a similar notation has been introduced for the noiseless signals $\tilde{x}_k(\xi_{k+1}, \hat{\theta}_{k-d})$.

As an alternative to the above classical approach we propose per-survivor estimation of the unknown quantities. In this technique, for each possible survivor in the trellis (one per node in the case of the standard VA), in addition to the accumulated metrics (7), state sequences (8), and source sequences (9), the encoded symbol sequences, denoted as $s_k(\mu_k) = (a_0, a_1, \ldots, a_{k-1})^T$, are also retained and extended over the transitions that verify (7), according to $$s_{k+1}(\mu_{k+1}) = (s_k^T(\mu_k) : a_k(\xi_{k+1}))^T \quad (13)$$

Again, if L=0, the symbol minimizing (6) is used in this extension. The data sequence employed in data-aided estimation of the branch metric corresponding to a particular state transition is precisely the encoded sequence associated to the survivor leading to the starting state. Per-survivor estimates of the unknown vector $\theta$ may be defined as $$\hat{\theta}_k(\mu_k) = g(s_k(\mu_k)) \quad (14)$$

With this notation, approximations of MLSE algorithms based on per-survivor processing may be formally obtained by replacing (4) with $$\lambda_{k+1}(\xi_{k+1}) = |\tilde{y}_k(\hat{\theta}_k(\mu_k)) - \tilde{x}(\xi_{k+1}, e, cir \hat{\theta}_k(\mu_k))|^2 \quad (15)$$

We stress that the estimates are based on the encoded sequences associated to the survivors terminating in the starting states $\mu_k$. The method then proceeds according to steps (4)–(7) above.

The intuitive rationale for this type of approximate realization of MLSE is straightforward: whenever the incomplete knowledge of some quantities prevents us from calculating the branch metric associated with a particular transition in a precise and predictable form, we use estimates of those quantities based on the encoded symbol sequence associated with the survivor leading to the starting state. If any particular survivor is correct (an event of high probability under normal operating conditions), the corresponding estimates are evaluated using the correct data sequence. Since at each stage of decoding we do not know which survivor is correct (or the best), we extend each survivor based on estimates obtained using its associated data sequence. This results in a considerable reduction of error propagation with respect to the above described classical approach. Roughly speaking, it can be said that the best survivor is extended using the best data sequence available (which is the sequence associated to it), regardless of our temporary ignorance as to which survivor is the best. This concept, inherent in DDFSE and RSSE, can be generalized in the above sense to the approximation of MLSE algorithms in many types of uncertain environments.

Assuming that the adopted data-aided estimator has the property that, in the absence of noise and for the correct data-aiding sequence, it produces correct estimates of the unknown parameters, then the resulting PSP-based approximate MLSE procedure provides a correct estimation of the data sequence in the absence of noise. Based on the above, we note that the PSP method according to the invention results in an asymptotically optimum decoding procedure for vanishing noise.

4. Applications of PSP

As a first area for possible applications of PSP, we consider adaptive MLSE with uncoded/coded modulations over ISI channels. We begin by presenting results for the case of an unknown discrete-time channel. This is a rather fundamental example, since it is of interest in approximate realizations of adaptive MLSE receivers based on the use of a fixed 'average' WMF as in [6], [35], as well as in more complex receivers which incorporate an adaptive WMF, such as those described in [4]. A first example (Sect. 4.1) is based on the use of a MSE channel estimator. In a second example (Sect. 4.2), the method approximates the joint maximum-likelihood estimate of data sequence and discrete channel. As a third example (Sect. 4.3), we consider a sequence estimator based on an ARMA model for the discrete channel. This channel model allows us to represent long impulse responses by a moderate number of coefficients.

The adaptivity of the WMF is then considered (Sect. 4.4). As is the case for other unknown parameters, the WMF can also be estimated using PSP techniques. The invention can be used jointly with any mentioned PSP-MLSE decoder to yield a totally PSP-based adaptive MLSE receiver. Finally, as a second broad area for a possible application of PSP techniques, we consider phase synchronization for coded modulations over a time varying non-dispersive channel (Sect. 4.5).

We do not explicitly discuss RSSE here, as it has been widely described in the literature. The methods according to the invention may, however, be combined with RSSE in a straightforward way in order to realize reduced-state adaptive MLSE decoders (some examples are presented in Section 6). Besides the considered cases, many other applications of PSP are imaginable and possible.

4.1 Adaptive MLSE based on MSE channel identification

Several authors have proposed the use of Mean Square Error (MSE) channel estimation techniques in the realization of adaptive MLSE decoders [4], [6], [35], [36]. In all cases, preliminary decisions were used in the estimation process according to the block diagram in FIG. 2. In this subsection, we propose the use of per-survivor MSE channel estimation within an MLSE system. First, we introduce a vector representing a time-dependent, state-dependent estimate of the discrete channel impulse response $$\hat{f}_k(\mu_k) = (\hat{f}_{k,0}(\mu_k), \hat{f}_{k,1}(\mu_k), \ldots, \hat{f}_{k,L}(\mu_k))^T \quad (16)$$

and a time-dependent, transition-dependent encoded symbol vector $$a_k(\xi_{k+1}) = (a_k(\xi_{k+1}), a_{k-1}(\xi_{k+1}), \ldots, a_{k-L}(\xi_{k+1}))^T \quad (17)$$

where $L > 1$ has been assumed as we concentrate on ISI channels. This vector notation allows us to represent a discrete-time convolution sum as a scalar product in the expression of the noiseless signals[7]

$$\tilde{x}_k(\xi_{k+1}) = \sum_{i=0}^{L} \hat{f}_{k,i}(\mu_k) \cdot a_{k-i}(\xi_{k+1}) = \hat{f}_k^T(\mu_k) \cdot a_k(\xi_{k+1}) \quad (18)$$

[7]If reduced-state decoding is desired, (18) is replaced by $$\tilde{x}_k(\xi_{k+1}, s_k(\mu_k)) = \sum_{i=0}^{K} \hat{f}_{k,i}(\mu_k) \cdot a_{k-i}(\xi_{k+1}) + \sum_{i=K+1}^{L} \hat{f}_{k,i}(\mu_k) \cdot a_{k-i}(s_k(\mu_k))$$

where K is the truncated channel memory [4]-[5], [10]-[18].

The PSP method according to the invention then proceeds as follows: At the k-th epoch, for all possible transitions $\xi_{k+1}$, the following errors are calculated:

$$e_k(\xi_{k+1}) = y_k - \tilde{x}_k(\xi_{k+1}) = y_k - \hat{f}_k^T(\mu_k) a_k(\xi_{k+1}) \quad (19)$$

One step of the Viterbi algorithm is performed for each successor state, according to $$\Gamma_{k+1}(\mu_{k+1}) = \min_{\mu_k}[\Gamma_k(\mu_k) + |e_k(\xi_{k+1})|^2] \quad (20)$$

The channel estimates $\hat{f}_k(\mu_k)$ are then updated based on the classic stochastic gradient algorithm [6][8]

$$\hat{f}_{k+1}(\mu_{k+1}) = \hat{f}_k(\mu_k) + \beta e_k(\xi_{k+1}) a_k^*(\xi_{k+1}) \quad (21)$$

over those traditions $\xi_{k+1}$ that verify (20), with the result that they are associated to the survivors (not to the states). The constant $\beta$ is selected u a compromise between speed of convergence and stability as in the usual stochastic gradient algorithm. If desired, the channel estimate may be normalized such that $\hat{f}_0 = 1$ simply by not updating the first component of the channel vectors. As a final remark, we note that associated with each survivor, besides a metric and a data sequence typical of the Viterbi algorithm, there are now an estimate of the encoded symbol sequence $s_k(\mu_k)$ and an estimate of the channel response $\hat{f}_k(\mu_k)$.

[8]The symbol [.]* denotes complex conjugation.

4.2 Simultaneous ML estimation of channel and sequence

Given the observation sequence $\{y_n\}_{n+0}^k$, the joint ML estimate of data sequence and channel impulse response is obtained by maximizing the likelihood function over $\{a_n\}_{n+1}^k$ and $\{f_n\}_{n+0}^L$ according to $$\max_{\{a_n\}_{n=0}^{k}, \{f_n\}_{n=0}^{L}} \left( - \sum_{n=0}^{k} \left| y_n - \sum_{i=0}^{L} f_i \cdot a_{n-i} \right|^2 \right) \quad (22)$$

This operation can be accomplished through a maximization over $\{f_n\}_{n+0}^L$ for each possible data sequence, followed by a maximization of the result over the discrete set of all data sequences. An exhaustive search over all possible data sequences yields the desired joint ML estimate, but is not practical due to the large number of possible sequences. An approximate implementation of the above maximization problem can be based on PSP, meaning that the channel impulse response can be derived by maximizing (22) over $\{f_n\}_{n+0}^L$ for each survivor sequence. The survivor metrics represent the value of the likelihood function for the associated survivor sequences, in which the maximization over the channel parameters has already been performed. Associated with each survivor we have now an estimate of the channel impulse response $\hat{f}_k(\mu_k)$. Consequently, the survivor with the largest metric has associated to it the desired joint estimate of channel and sequence.

The maximization of the likelihood function with respect to the channel vector for a given survivor sequence (i.e., the inner maximization in (22)) may be performed by a Recursive Least Square (RLS) algorithm [6]. At the k-th step, $\hat{f}_{k+1}(\mu_{k+1})$ is estimated by recursively minimizing $$\epsilon_{k+1}(\mu_{k+1}) = \sum_{n=0}^{k} w^{k-n} \left| y_n - \sum_{i=0}^{L} \hat{f}_{k+1,i}(\mu_{k+1}) \cdot a_{n-i} \right|^2 \quad (23)$$

$$= \sum_{n=0}^{k} w^{k-n} |y_n - \hat{f}_{k+1}^T(\mu_{k+1}) \cdot a_n(\xi_{n+1})|^2$$

in which, the encoded sequence $\{a_n\}_{n+0}^k$ and the state sequence $\{\mu_n\}_{n=0}^k$ are associated to the particular survivor. The weighting factor $0 < w < 1$ is introduced to limit the memory of the algorithm to allow for slowly time-varying channels.

At the k-th step, for all possible transitions $\xi_{k+1}$ the errors are calculated as in the previous subsection:

$$e_k(\xi_{k+1}) = y_k - \hat{f}_k^T(\mu_k) \cdot a_k(\xi_{k+1}) \quad (24)$$

where $L \geq 1$ has been assumed as we concentrate on ISI channels. One step of the Viterbi algorithm is then performed according to (20). For the transitions $\xi_{k+1}$ that extend the survivors, the Kalman gain vectors, inverse of the correlation matrices, and channel impulse responses, respectively, are updated according to $$k_{k+1}(\mu_{k+1}) = \frac{P_k(\mu_k) a_k^*(\xi_{k+1})}{w + a_k^T(\xi_{k+1}) P_k(\mu_k) a_k^*(\xi_{k+1})} \quad (25)$$

$$P_{k+1}(\mu_{k+1}) = \frac{1}{w} [P_k(\mu_k) - k_{k+1}(\mu_{k+1}) a_k^T(\xi_{k+1}) P_k(\mu_k)]$$

$$\hat{f}_{k+1}(\mu_{k+1}) = \hat{f}_k(\mu_k) + k_{k+1}(\mu_{k+1}) e_k(\xi_{k+1})$$

These updated channel vectors are then used in the next step of the procedure. Note that associated with each survivor there are now a metric, a survivor sequence, a channel vector, a Kalman gain vector, and an estimate of the inverse of the correlation matrix (of the survivor sequence).

4.3 Adaptive MLSE based on ARMA channel modeling

The approach we follow here is conceptually different from the previous two sections. In the decoding process, the observed sequence $\{y_n\}_{n+0}^k$ is effectively compared to hypothetical noiseless signal sequences which are modeled as ARMA processes. This approach is especially useful in the case of channels with long impulse responses, such as typical digital subscriber loops of Integrated Service Digital Networks (ISDN) [37], [38]. The basic non-adaptive sequence estimator was proposed in [8], [9] and later modified and extended in [12]. The decoder state is now defined as $$\mu_k = \begin{cases} \sigma_k & Q = 0 \\ (\sigma_k; a_{k-1}, a_{k-2}, \ldots, a_{k-Q}) & Q \geq 1 \end{cases} \quad (26)$$

in which, Q denotes the degree of the numerator in the channel model $$F(z) = \frac{\sum_{i=0}^{Q} c_i z^{-i}}{1 - \sum_{j=1}^{P} d_j z^{-j}} \quad (27)$$

If $Q \geq 1$ is chosen, the branch metrics associated to a given transition $\xi_{k+1}$ are obtained, for this non-adaptive case, using the following noiseless signals $$\hat{x}_k(\xi_{k+1}) = \sum_{i=0}^{Q} c_i a_{k-i}(\xi_{k+1}) + \sum_{j=1}^{P} d_j \hat{x}_{k-j}(\mu_k) \quad (28)$$

in which the first summation is specified given the state transition $\xi_{k+1}$ and the second is estimated based on previous values of $\hat{x}_k$ found in the survivor history. If $Q = 0$, associated to a specific transition there is a symbol subset $A_k(\xi_{k+1})$. As in Section 2, the branch metrics for this case are defined as $$\lambda_{k+1}(\xi_{k+1}) = \min_{a_k \in A_k(\xi_{k+1})} |y_k - a_k + \sum_{j=1}^{P} d_j \hat{x}_{k-j}(\mu_k)|^2 \quad (29)$$

in which, again, the summation is based in the noiseless signals found in the survivor history. We stress that the second summation in (28) and (29) is exactly the unknown term which we estimate using the survivor history.

This decoder can be turned into an adaptive one by estimating the coefficients of the ARMA channel model in order to minimize the MSE between the observed sequence $\{y_n\}_{n=0}^{k}$ and the estimated noiseless signals. A conventional approach would be based on the use of tentative decisions on the noiseless signals, for example, using the symbol sequence associated to the temporarily best survivor. In a PSP-based adaptive decoder, each survivor independently estimates its own channel by minimizing the MSE between the observed signal and the noiseless signal associated to it. To this purpose, we chose the simple gradient algorithm [40] to control the coefficients of the ARMA channel model associated to each survivor. We concentrate here on the case $Q \geq 1$, as the extension for $Q = 0$ is straightforward. As usual, we define the error associated to a particular transition, at the k-th epoch, as $$e_k(\xi_{k+1}) = y_k - \hat{x}_k(\xi_{k+1}) \quad (30)$$

where $x_k(\xi_{k+1})$ is now used to emphasize that an approximated value is used, and perform one step of the Viterbi algorithm according to (20). The coefficients of the channel models are then updated over the transitions that verify (20), according to the per-survivor gradient algorithm [40]

$$c_{k+1,i}(\mu_{k+1}) = c_{k,i}(\mu_k) + \beta e_k(\xi_{k+1}) a_{k-i}^*(\mu_{k+1}) \\ i = 0, 1, \ldots, Q \quad (31)$$

$$d_{k+1,j}(\mu_{k+1}) = d_{k,j}(\mu_k) + \beta e_k(\xi_{k+1}) \gamma_{k-j}^*(\mu_{k+1}) \\ j = 1, 2, \ldots, P \quad (32)$$

where $\{a_{k-i}(\mu_k)\}_{i=1}^{max(P,Q)}$ and $\{\gamma_{k-j}(\mu_k)\}_{j=1}^{max(P,Q)}$ are sequences associated to the survivors terminating in states $\mu_k$, updated on a per-survivor basis according to:

$$a_k(\mu_{k+1}) = a_k(\mu_{k+1}) + \sum_{j=1}^{P} d_{k,j}(\mu_k) a_{k-j}(\mu_k) \quad (33)$$

$$\gamma_k(\mu_{k+1}) = \hat{x}_k(\xi_{k+1}) + \sum_{j=1}^{P} d_{k,j}(\mu_k) \gamma_{k-j}(\mu_k) \quad (34)$$

4.4 Adaptive whitened matched filter

In the applications we have so far presented, it was assumed that the unknown channel could be completely characterized through its discrete white-noise equivalent. The problem of estimating the channel was thus limited to the estimation of the discrete channel. In a more general situation, this task is only a part of the channel estimation problem. In fact, the discrete channel is obtained as the output of a WMF which must be estimated as well. The estimation of the WMF is the topic of this subsection.

It is well-known that the WMF is also the optimum feedforward filter in a Zero-Forcing (ZF) DFE [34], [41]. A possible approximate approach to the estimation of the WMF is obtained by using the optimum feedforward section of a MSE-DFE, which, in the limit of vanishing noise, equals the ZF-DFE. For a digital implementation, the filter can be realized through a fractionally spaced transversal filter. As an example, this approach was followed in [4] by basing the adaptive control of the WMF coefficients on zero-delay tentative decisions.

As an alternative to the use of preliminary decisions, PSP can be used. To this purpose, we denote as $r_k$ the content, at epoch k, of the tapped delay line of a $T/\Omega$-spaced transversal filter, with $\Omega$ being a small integer representing the oversampling factor (with respect to the baud rate)

$$r_k = \left( r(kT), r\left(kT - \frac{T}{\Omega}\right), r\left(kT - 2\frac{T}{\Omega}\right), \ldots, r\left(kT - (N-1)\frac{T}{\Omega}\right) \right)^T \quad (35)$$

in which r(t) is the received signal (see FIG. 2) and N is the number of taps. Denoting by the vector $b_k(\mu_k)$ the coefficients of the WMF associated to the path leading to state $\mu_k$, the per-survivor baud-rate signals at the output of the WMFs are $$\bar{y}_k(\mu_k) = r_k^T \cdot b_k(\mu_k) \quad (36)$$

If a PSP adaptive implementation of the WMF is desired, these signals can be used in the computation of the errors associated to the transitions (19), (24), and (30). Finally, the tap vectors $b_k(\mu_k)$ are updated according to $$b_k(\mu_{k+1})=b_k(\mu_k)-\delta e_k(\xi_{k+1})r_k^* \quad (37)$$

over the transitions that extend the survivors, with $\delta$ being a suitable constant selected as a compromise between speed of convergence and stability.

4.5 Joint TCM decoding and phase synchronization

In this subsection we present an application of PSP techniques to the estimation of only one channel parameter, namely, the carrier phase. This could be considered a special case of the previous applications; in fact, a channel estimator is, in principle, always capable of tracking a phase rotation introduced by the channel. ISI is assumed absent here, a typical situation of wide-band channels (such as satellite or certain microwave links), and TCM is incorporated. In this case, the Viterbi decoder operates for TCM decoding purposes only.

As shown in [3], a carrier recovery decision-directed loop may be used, which uses preliminary decisions from the Viterbi decoder. An analysis of the optimal delay to be used in such tentative decisions showed that a delay of a few symbol intervals is preferable—a larger delay improves the quality of the decisions but increases excessively the loop time constant. PSP is perfectly suitable to this situation. Approaching the problem as we aid in Sect. 4.2, the joint maximum-likelihood estimate of carrier phase and data sequence is obtained by solving the following maximization problem $$\max_{\{a_n\}_{n=0}^k \phi} \max\left(-\sum_{n=0}^{k} |y_n e^{-j\phi} - a_n|^2\right) \quad (38)$$

in which the phase rotation factor is representative of the carrier phase recovery process acting on the observed signal $y_k$ and $\mu_k$ is the state in the code trellis [3]. For each data sequence $\{a_n\}_{n=0}^k$, the maximization of (38) with respect to $\phi$ yields $$\phi(a_0, a_1, \ldots, a_k) = \arg\left(\sum_{n=0}^{k} y_n a_n^*\right) \quad (39)$$

Following [3] and [42], an iterative solution to the problem of estimating the carrier phase is obtained according to $$\phi_{k+1}=\phi_k+\eta\, Im\{y_k\, e, cir\, \hat{a}_k^* e^{-j\phi k}\} \quad (40)$$

in which, preliminary decisions from the Viterbi decoder are used and $\eta$ is a suitable constant. Alternatively, using PSP the meted is modified as follows. At the k-th epoch, the branch metrics are evaluated according to $$\lambda_{k+1}(\xi_{k+1}) = \min_{a_k \in A_k(\xi_{k+1})} |y_k e^{-j\phi(\mu_k)} - a_k|^2 \quad (41)$$

and the per-survivor phase estimates are updated for the transitions that extend the survivors according to $$\phi_{k+1}(\mu_{k+1})=\phi_k(\mu_k)+\eta\, Im\{y_k a_k^* e^{-j\phi k(\mu k)}\} \quad (42)$$

where the symbol $a_k \in A_k(\xi_{k+1})$ minimizing (41) is used.

5. Approximate analysis of adaptive PSP-MLSE

Among the various applications of PSP techniques, adaptive MLSE has received substantial attention in the previous section. Other applications of PSP, such as DDFSE or RSSE, have been analyzed in [12], [14], [17], [18] under the assumption that error propagation has negligible effects. In this section, we present a simplified analysis of adaptive PSP-based MLSE, applicable to any full-complexity or reduced-complexity decoder. To this purpose, we also adhere to the assumptions which formed the basis of the analysis in [35]: (a) the channel estimate update is independent of the input data sequence and noise; and (b) the noise component contributed by the channel estimation error is Gaussian. In the non-adaptive case, the classical union bound on the probability of symbol error for any epoch k can be expressed as (see [2] and above cited papers)

$$P_s \leq \sum_{d \in D} Q\left(\frac{d}{2\sigma}\right) \sum_{e \in E_d} w(e) P_e \quad (43)$$

where e is an error event starting at epoch k, $E_d$ is the set of error events with distance d, D is the set of the possible distances, w(e) is the number of symbol errors associated to the error event e, and $P_e$ is the probability that the data sequence is compatible with the error event e. This expression is usually approximated further by retaining the minimum-distance terms only, or at most a few terms with low distance.

In the case d an adaptive sequence estimator, the effects of the variation in the channel estimate must be taken into account. Towards this end, we define an effective noise variance $\sigma_{eff}^2$ as that of an equivalent Gaussian process which models the channel noise plus the noise due to errors in channel estimation. Thus, $$\sigma_{eff}^2=\sigma^2+\sigma_{est}^2 \quad (44)$$

Here, $\sigma^2$ is the variance of channel noise and $\sigma_{est}^2$ represents the mean square value of the zero-mean noise due to the adaptive channel estimation process. In order to determine an approximate expression for $\sigma_{est}^2$, we recall from [6], [43], [44] that in Least Mean Square (LMS) and recursive least square adaptive processing, the excess MSE due to the adaptation process is related to $\sigma_{min}^2$, the minimum MSB, defined as the MSE associated to the optimum coefficients (non-adaptive case). Specializing these results to the case of adaptive MSE channel estimation, $\sigma_{est}^2$ is approximately given by [44]

$$\sigma_{est}^2 \approx \frac{\beta}{2}(L+1)E\{|a_n|^2\}\sigma_{min}^2 \quad (45)$$

in which, the constant $\beta$ is the step-size used in (21) and L is the number of samples in the estimated channel response (assumed identical to the channel memory). For the case of joint maximum-likelihood estimation of channel and data, the expression for $\sigma_{est}^2$ becomes [43]

$$\sigma_{est}^2 = \frac{(L+1)E\{|a_n|^2\}(1-w)\sigma_{min}^2}{(1+w)} \quad (46)$$

where w is the weight in factor in (23). For PSP-based channel estimation, an approximation for $\sigma_{min}^2$ can be obtained by considering the mean square value contributed by the error sequence associated with the best path $$\sigma_{min}^2 = E\{|y_n - \hat{x}_n|_{\hat{f}=f}^2\} \quad (47)$$

$$= E\{|y_n - \hat{x}_n|_{\hat{f}=f}^2|\hat{x}_n \text{ correct}\}P\{\hat{x}_n \text{ correct}\} +$$

$$\sum_e E\{|y_n - \hat{x}_n|_{\hat{f}=f}^2|\hat{x}_n \text{ incorrect}, e\}P\{\hat{x}_n \text{ incorrect}, e\}$$

Here, $P\{\hat{x}_n \text{ correct}\}$ is the probability that the estimated noiseless signal $\hat{x}_n$ is correct, and $E\{|y_n-\hat{x}_n|_{\hat{f}=f}^2|\hat{x}_n \text{ correct}\}$, the mean square difference between the channel output $y_n$ and the estimated signal $\hat{x}_n$ given the event $\{\hat{x}_n \text{ correct}\}$, equals the noise variance. The conditional expectation $E\{|y_n-\hat{x}_n|_{\hat{f}=f}^2|\hat{x}_n \text{ incorrect}, e\}$, the mean square difference between the channel output $y_n$ and the estimated signal $\hat{x}_n$ given that $\hat{x}_n$ is in error and the error event e is undergoing, can be approximated via an ergodicity argument: the conditional ensemble average is equal to the time average over the specific error event. This time average is the sum of $|y_n-\hat{x}_n|_{\hat{f}=f}^2$ over the length of the error event divided by the number of symbol errors entailed by that event. With the additional assumption that the contribution of thermal noise is negligible, we have $$|y_n-\hat{x}_n|_{\hat{f}=f}^2 \approx |x_n-\hat{x}_n|_{\hat{f}=f}^2 \quad (48)$$

where $x_n$ is the correct noiseless signal, with the result that the second conditional expectation in (47) can be expressed as $d^2(e)/w(e)$. Similarly, $P\{\hat{x}_n \text{ incorrect}, e\}$ is the probability that $x_n$ in error with a specific error event e associated. Recalling the expression for the probability of a specific error event, this term is $$P\{\hat{x}_n \text{ incorrect}, e = w(e)P_e Q\left(\frac{d(e)}{2\sigma}\right) \quad (49)$$

Replacing $P\{\hat{x}_n \text{ correct}\}$ by 1 and using the upper bound as an approximation of the true value, the above arguments allow us to express $\sigma_{min}^2$ as $$\sigma_{min}^2 \approx \sigma^2 + \sum_{d \in D} d^2 Q\left(\frac{d}{2\sigma}\right) \sum_{e \in E_d} P_e \quad (50)$$

As in the evaluation of the probability of error, (50) can be further approximated by considering the minimum distance terms only (or the terms with low distance).

Finally, eq. (50) is used in (45) (or (46)) and (44), respectively, to evaluate the effective noise variance. We note that this approximate analysis can be generalized to the case of time-varying channels by replacing (45) and (46) with suitable expressions which can be adapted from [43], [44] in a similar fashion. As a further comment, we observe that (50) is derived assuming $\hat{x}_n$ is associated with the best path. In the case of PSP, this assumption is legitimate because there always exists a survivor with an associated effective noise variance that can be so expressed, namely, the best survivor. On the contrary, for an estimator based on tentative decisions, a more complex derivation of the effective noise variance would be required in order to account for the decoding errors affecting the data-aiding sequence. Despite this fact, this assumption was used in [35] also.

The above described analytic method can be refined by viewing the value of $\sigma_{eff}^2$ just derived as an initial estimate of the effective noise variance to be used in the second term of (50), then in (45) (or (46)) and (44), respectively. This leads to an iterative procedure for solving an equation of the form $$\sigma_{eff}^2 = \sigma^2 + \sigma_{est}^2(\sigma_{eff}^2) \quad (51)$$

In evaluating $\sigma_{est}^2(\sigma_{eff}^2)$ for a given value of $\sigma_{eff}^2$, eqns. (45) (or (46)) and (50) are employed. The procedure is initialized by setting $$\sigma_{eff}^2 = \sigma^2 \quad (52)$$

and is terminated when convergence has taken place (in all tested numerical cases, the procedure converged in a few steps).

Finally, the probability of symbol error is evaluated through (43), wherein instead of $\sigma^2$, using the value of effective noise variance determined above. As we mentioned, the upper bound can be approximated by considering terms with low distance only. Similarly, the lower bound of [2] can also be evaluated.

6. Numerical results

Several of the PSP-based approximate MLSE algorithms presented in the previous sections are here simulated and analyzed. For a comparison purpose, in each case, we also consider conventional adaptive MLSE decoders based on the use of preliminary decisions according to the classical approach previously described. According to the general block diagram of these decoders shown in FIG. 2, D denotes the delay in the decoded source sequence and $d<D$ is the delay in a preliminary decoded sequence used for parameter estimation. In all the simulation work, D is set to D=200 to avoid any performance degradation due to unmerged survivors, despite the fact that a smaller delay could have been sufficient in most cases. The delay in preliminary decisions is varied in the range from d=0 (zero-delay tentative decisions) to several units. In all cases the comparison is performed using the same parameter estimators in conventional and PSP decoders.

Define the symbol energy $E_s$, as $$E_s = E\{|a_k|^2\} \sum_{i=0}^{L} |f_i|^2 \quad (53)$$

and measure the probability of erroneously detecting a transmitted symbol by counting 400 symbol errors per $E_s/N_0$ value in all cases.

6.1 Adaptive MLSE based on MSE channel identification

Figure 3:
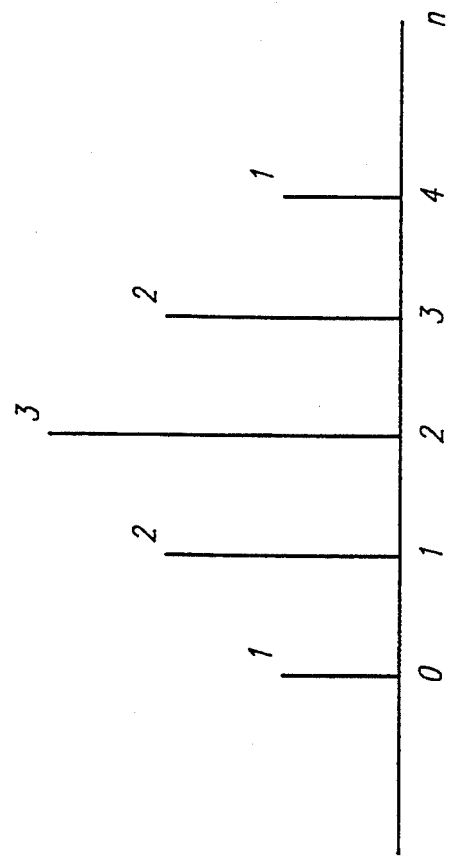
FIG. 3 illustrates a discrete-time channel response.

We address here the performance of the PSP algorithm for joint sequence decoding and channel identification presented in Section 4.1. The considered modulation scheme is uncoded Quadrature Amplitude Modulation with an alphabet of 16 symbols (16-QAM) transmitted over an ISI channel, with a symmetrical frequency response with respect to the carrier frequency. The white-noise discrete-time model of this system has an impulse response that was selected among the examples in [6] and is characterized by in-band zeros. Its impulse response is shown in FIG. 3.

With the selected modulation format and channel responses a full-state decoder would require $16^4=65,536$ states. To overcome this state complexity, a reduced-state decoder is adopted, operating over a trucated channel with impulse response made of the first three samples of the true channel, thus with channel memory $K=2$. DDFSE is the selected reduced-state decoding algorithm, with the result that the number of states is reduced to $16^2=256$. The MSE channel identification algorithm operates in all cases with an updating step-size $\beta=0.01$.

Figure 4:
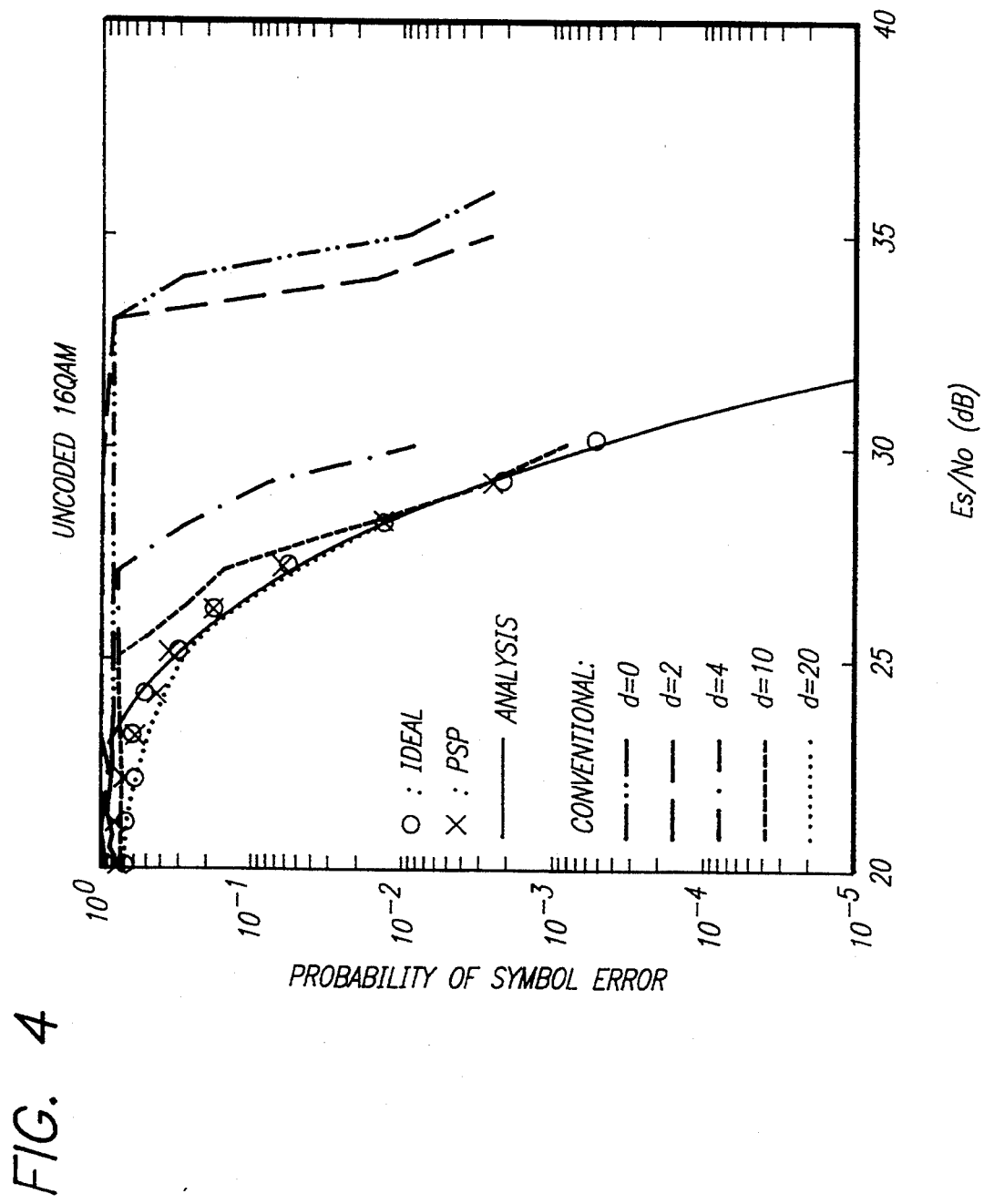
FIG. 4 illustrates the performance of the invention for the stationary channel of FIG. 3 as used for adaptive MLSE with mean square error (MSE) channel identification.

FIG. 4 shows the simulated system performance in a stationary environment, in which the channel is time-invariant and the estimator is correctly initialized to the true channel impulse response. In this figures the curve with worst performance is relative to a conventional decoder in which the channel estimation process is based on zero-dealy tentative decisions ($d=0$). An $E_s/N_0$ gain of approximately 1 dB is obtained by allowing a delay $d=2$ in preliminary decisions. Further gains of approximately 4 and 6 dB are found by increasing the delay to $d=4$ and $d=10$, respectively. Eventually, for $d=20$ the quality of the data-aiding sequence in the conventional system is sufficient to obtain a system performance practically equivalent, even at low $E_s/N_0$, to the performance of the ideal adaptive system that uses the correct sequence for channel estimation. In the figure, the performance of this ideal system is also shown along with the simulated error probability of the PSP-MLSE system.

Figure 5:
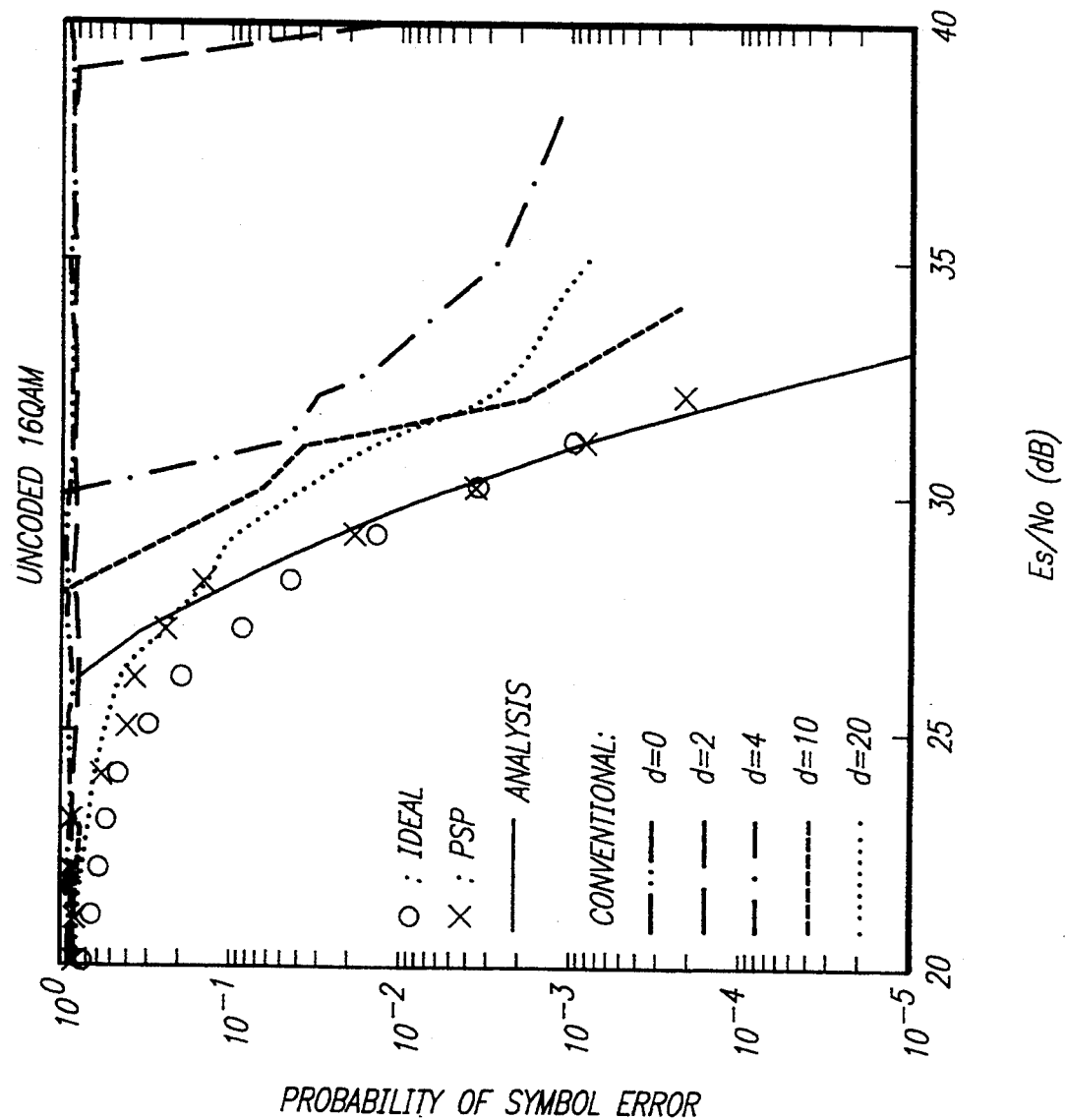
FIG. 5 illustrates the performance of the invention for MLSE/MSE for a time-varying channel.

As an example of data transmission over a time-varying channel, we have repeated the above comparison under the assumption that a sinusoidal attenuation with period of 1000 symbol intervals is introduced in the communication channel. To this purpose, the channel impulse response in FIG. 3 is modified by multiplying each sample with a sinusoidal factor according to $$f_k' = f_k(1+\alpha \cdot \cos(\Delta\omega k+\theta_0)) \quad (54)$$

in which $\alpha=0.1$ and $\Delta\omega=\omega=0.002\pi$. As before, the channel estimate is initialized to the correct channel impulse response. The results of this comparison are shown in FIG. 5. As in the previous figure, $d=4$ is the minimum delay in tentative decisions for which the conventional algorithm begins to exhibit acceptable performance. For the time-varying case, however, the performance cannot be improved simply by increasing d. In fact, a larger value of d produces a better data-aiding sequence and a larger delay in the reconstructed channel. For a compromise value $d=10$, the conventional adaptive decoder exhibits an $E_s/N_0$ loss of approximately 1.5 dB with respect to the ideal and PSP decoders. On the contrary, the PSP decoder performs practically as the ideal decoder, at least at medium to high $E_s/N_0$ values. The analytical curve for this time-varying case is obtained by averaging over time the error probability in which the distance terms are varied sinusoidally in acc Channel acquisition is also considered. Table 1 shows the measured acquisition time for the ideal, PSP, and conventional versions of the system. The acquisition time is defined as the number of signaling intervals that are required for the mean square difference between the estimated impulse response and the true channel impulse response to fall within a specified threshold equal to 0.0015. The channel estimate is initialized with $\hat{f}_0=(0, 0, 1, 0, 0)^T$. This measurement is relative to $E_s/N_0$ of 33 and 38 dB and $\beta=0.01$ and was performed by averaging over 100 independent runs. In this table, a percentage indicates, wherever necessary, the number of runs in which acquisition took place. It is clear that the acquisition time of the PSP decoder is about one-tenth with respect to the conventional decoder with a tentative delay $d\geq 20$. The convergence time of the conventional decoder cannot be reduced because the quality of tentative decisions cannot be improved further 6.2 Simultaneous ML estimation of channel and sequence The PSP system presented in Sect. 4.2 is here considered and compared to the corresponding conventional and ideal systems. A Pulse Amplitude Modulation with 4 symbols (4-PAM) is the selected signaling format and the channel in FIG. 3 is used.. In this case, the number of states of a full-complexity decoder is much lower with respect to the previous case because of the smaller number of source symbols. Based on this, we operate on the ISI affected signal with a full-state decoder which, in this case, has $4^4=256$ states. We note that stability and convergence rate of this RLS channel estimator is critically affected by the weight factor w. This parameter is set to $w=0.999$, which is found to give satisfactory results. The system is initialized by setting the Kalman gain vectors to zero and the inverse of the correlation matrices $P_0(s_0)$ to the identity matrix. The channel estimate is correctly initialized to the true channel response.

Figure 6:
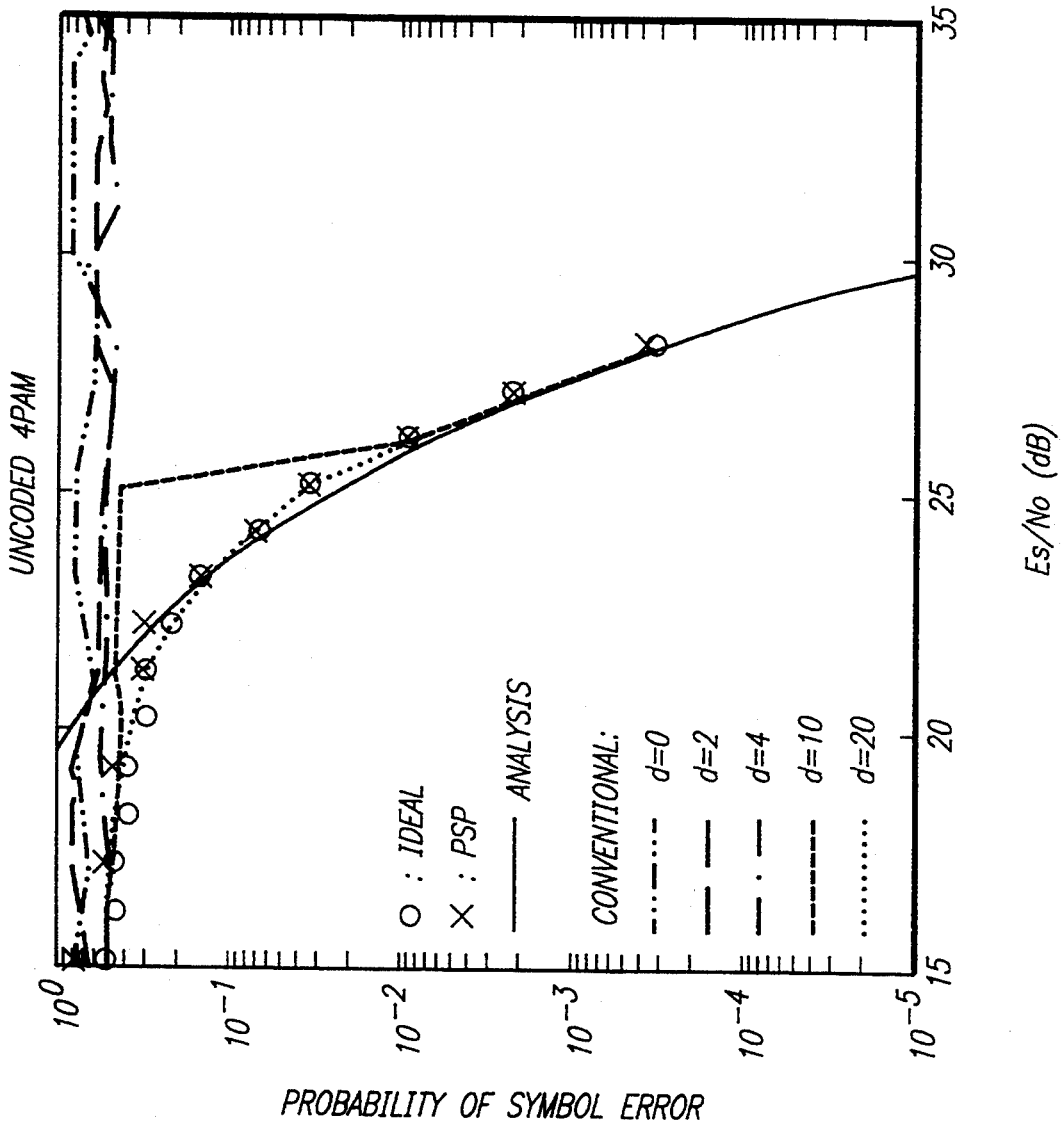
FIG. 6 illustrates the performance of the system according to the invention on a stationary channel for simultaneous ML estimation of a channel and a data sequence.

FIG. 6 shows the simulation results along with the approximate theoretical probability of symbol error computed using the first and the second minimum distance terms. Even in this case, the conventional system begins to show acceptable performance only if a delay of 10 symbols in preliminary decisions is allowed. The performance of the PSP decoder is apparently identical to that of the ideal decoder.

6.3 Adaptive MLSE based on ARMA channel modeling

In this part, we concentrate on the performance of the system described in section 4.3. As a model of channel with long impulse response, we assume that the discrete-time channel model is a simple one-pole IIR filter with transfer function $$F(z) = \frac{1}{1-0.9z^{-1}} \quad (55)$$

The order of the channel identificator in the PSP case is set to $Q=2$ and $P=1(4^2=16$ states). For a comparison purpose, a non-adaptive conventional decoder using the theoretical channel response with $L=5$ is chosen in order to assure that the number of multiplications and-/or additions in the conventional system is comparable to that of the ARMA/PSP system. The selected signaling format is uncoded Quadrature Phase Shift Keying(QPSK).

Figure 7:
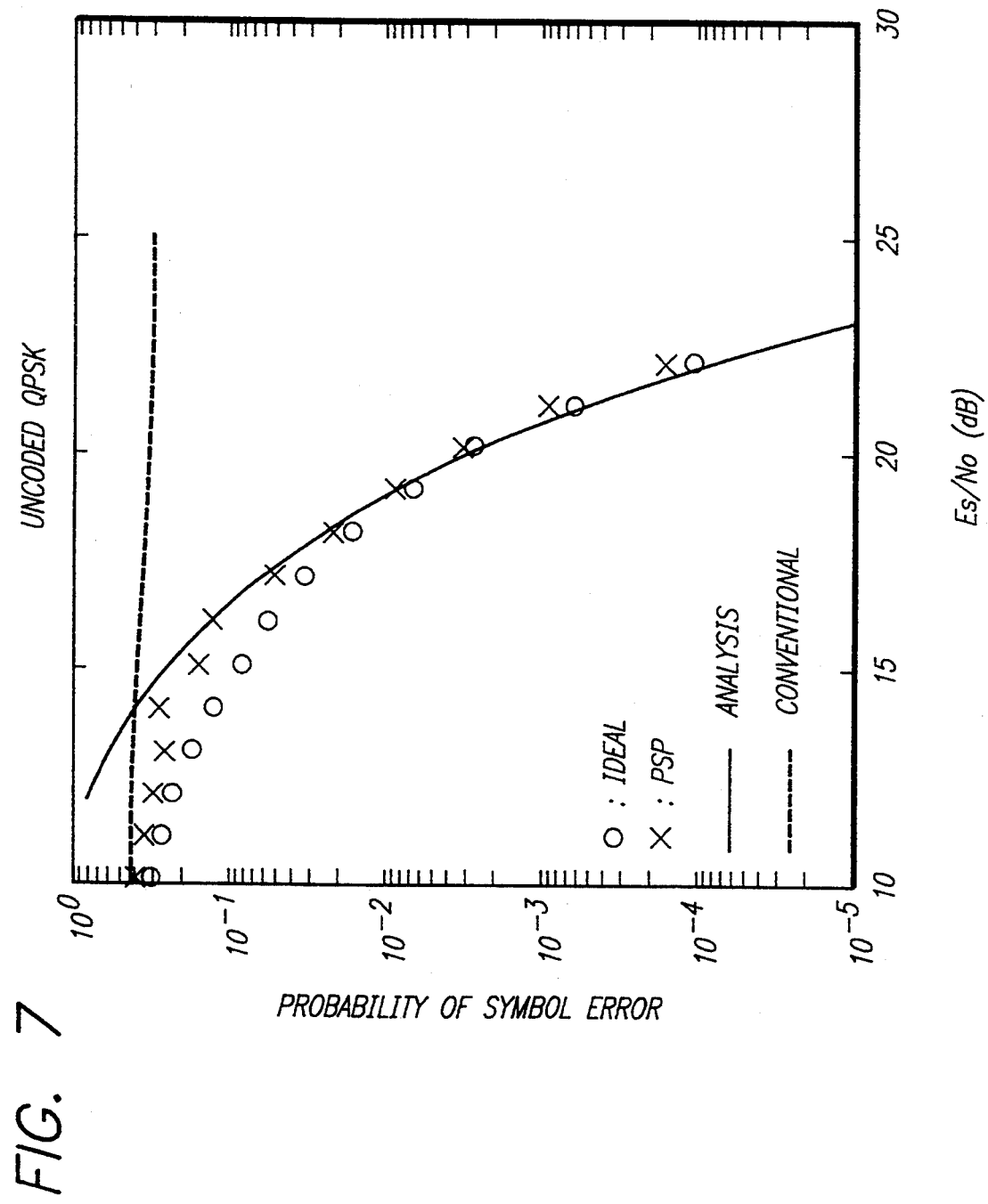
FIG. 7 illustrates the performance of the system according to the invention on a stationary channel for adaptive MLSE based on auto-regressive moving average (ARMA) channel modeling.

The simulated performance of these decoders for an updating step-size $\beta=0.0005$ is shown in FIG. 7, along with the approximate theoretical probability of symbol error derived using the minimum distance term as described in [9]. The numerical results for this channel show apparently the superiority of the ARMA/PSP approach. Simply, this happens because with a finite length model of ISI, impulse response truncation is inevitable.

6.4 Adaptive whitened matched filter

Figure 8:
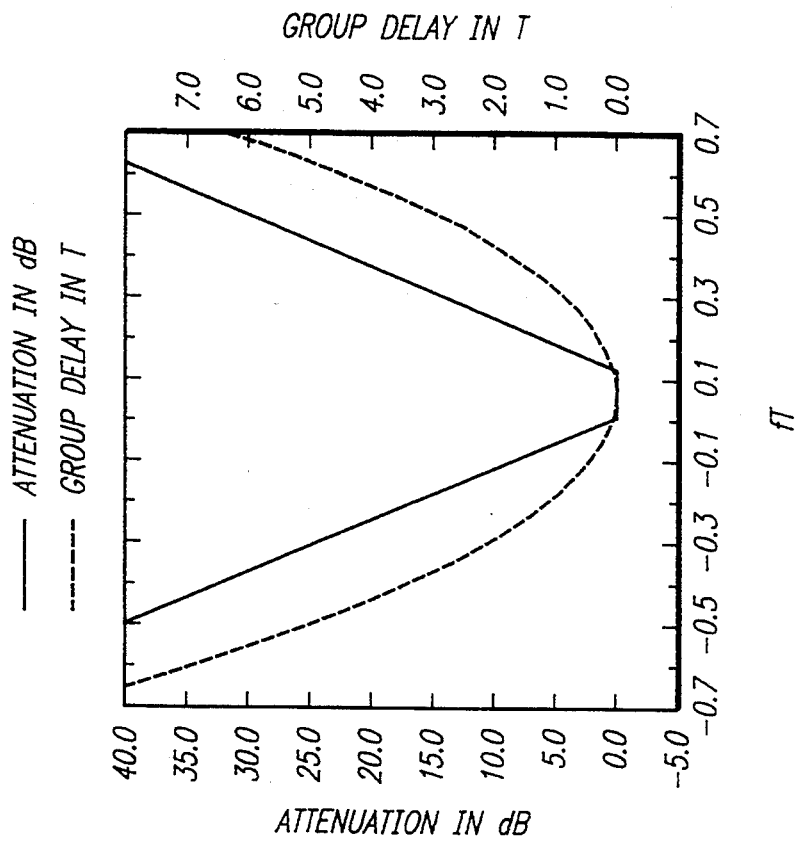
FIG. 8 shows the frequency response of a channel used for an adaptive whitened matched filter (WMF) test of the invention.

The results we present here are relative to a receiver that includes per-survivor adaptive whitened matched filters along with the discrete channel estimator in Sect. 4.1, operating with a reduced state decoder. A coded modulation scheme is adopted for this purpose, utilizing the 4-state TCM encoded 8-PSK signal proposed in [3]. The selected ISI channel exhibiting slope attenuation and parabolic delay is shown in FIG. 8. A transmitting filter with a square-root raised-cosine frequency response with rolloff factor 0.25 is also assumed. As described in Sect. 4.4, the WMF is digitally realized by a fractionally spaced transversal filter with oversampling factor $\Omega=2$ and $N=46$ coefficients. The discrete channel model used by the decoder is assumed to be characterized by a memory $L=5$, only partially represented in the combined code and ISI trellis, precisely by assuming $K=2$ (64 states). For comparison, we also consider the performance of a conventional adaptive decoder.

Figure 9:
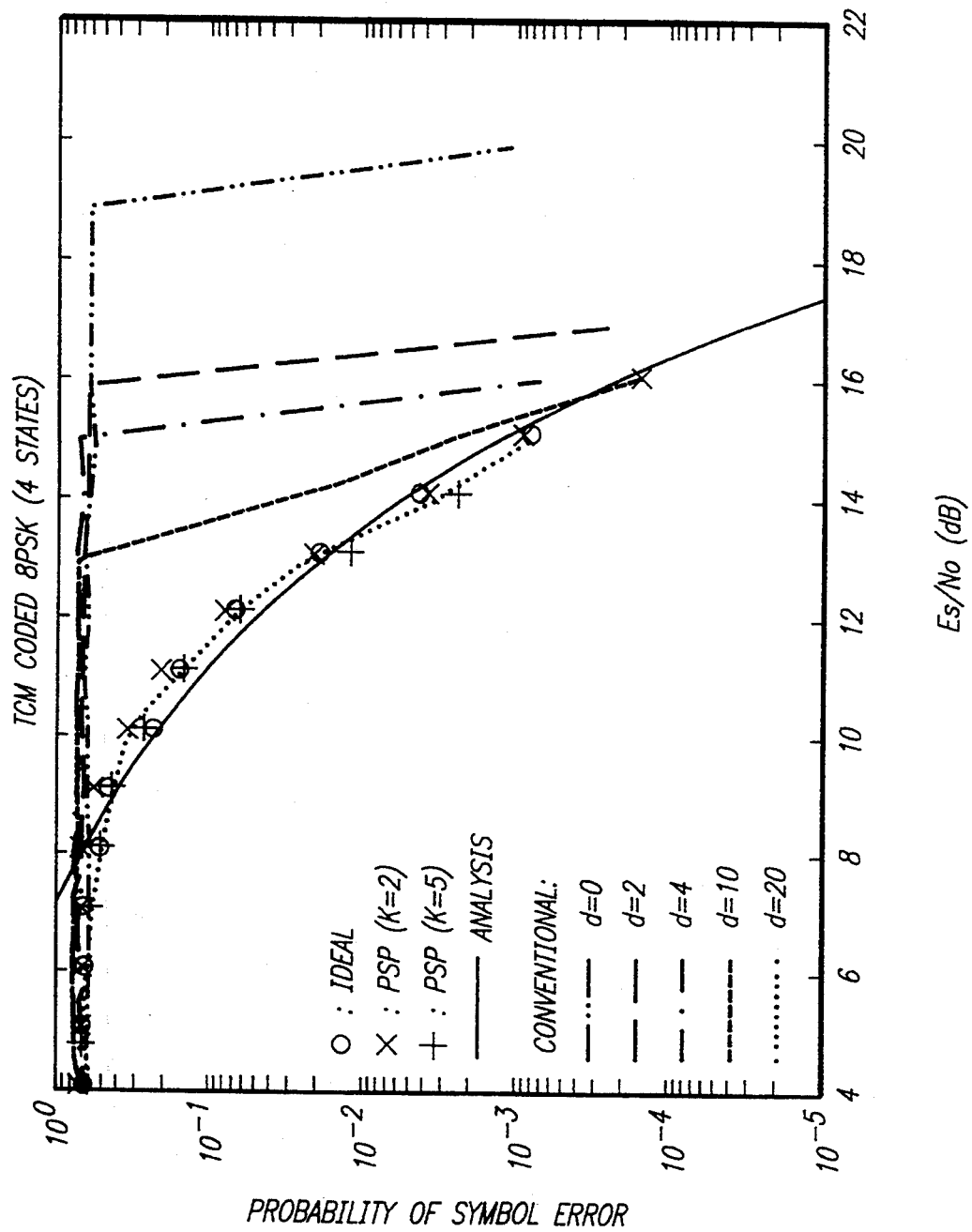
FIG. 9 illustrates the performance of the invention in an adaptive WMF receiver on the stationary channel of FIG. 8.

FIG. 9 shows the numerical results for this stationary case. The used updating step-sizes are $\delta=1\cdot10^{-5}$ and $\beta=0.01$. These results can be summarized as follows: (a) the conventional algorithm operating with zero-delay tentative decisions exhibits an $E_s/N_0$ loss of approximately 5 dB at a probability of error of $10^{-3}$; (b) larger values of d permit partial recovering of this loss but only for $d=20$ this loss is completely eliminated; (c) the PSP version of this decoder performs as the ideal decoder at all $E_s/N_0$ values. For convenience the figure also shows the analytical performance based on the first 6 minimum distance terms and the simulated performance of a full-state ideal decoder operating with $K=L=5$ (4096 states).

6.5 Joint TCM decoding and phase synchronization

This subsection differs from the previous ones in the fact that ISI is assumed absent and phase recovery is considered. In order to evidentiate the effectiveness of the PSP approach in a time-varying environment we model the phase rotation introduced by the channel as a Wiener random process by increasing the channel phase, at each symbol interval, by a Gaussian increment with zero mean and variance $0.00125$ $\text{rad}^2$. The method described in Sect. 4.5 is used, in its ideal, PSP, and conventional versions, assuming 4-state TCM encoded 8-PSK as a signaling format, and an updating step-size $\eta=0.2$.

Figure 10:
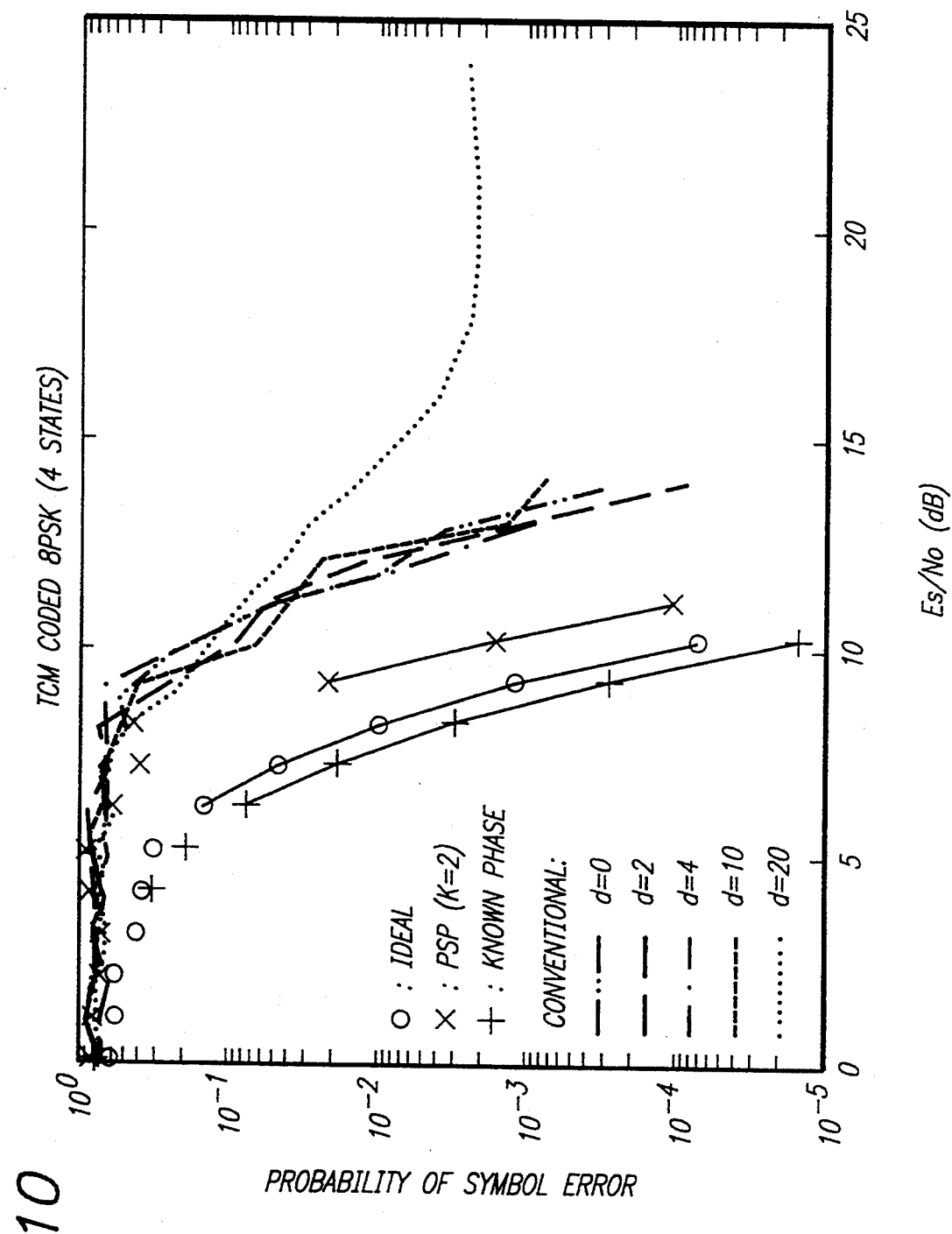
FIG. 10 illustrates the performance of the invention on a time-varying channel with joint trellis-coded modulation (TCM) and phase synchronization.

FIG. 10 shows the performance of the various decoders under the assumption of correct initialization of the estimated phase. From this figure, it is evident that in the time-varying environment the PSP approach is superior. In fact, a loss of approximately 3 dB is exhibited by the conventional system with respect to the PSP system, while the latter shows a loss of about 1 dB over the ideal decoder. The performance with known phase is also shown for comparison. It indicates that a loss of approximately 0.4 dB is exhibited in these conditions by the ideal system.

Figure 11:
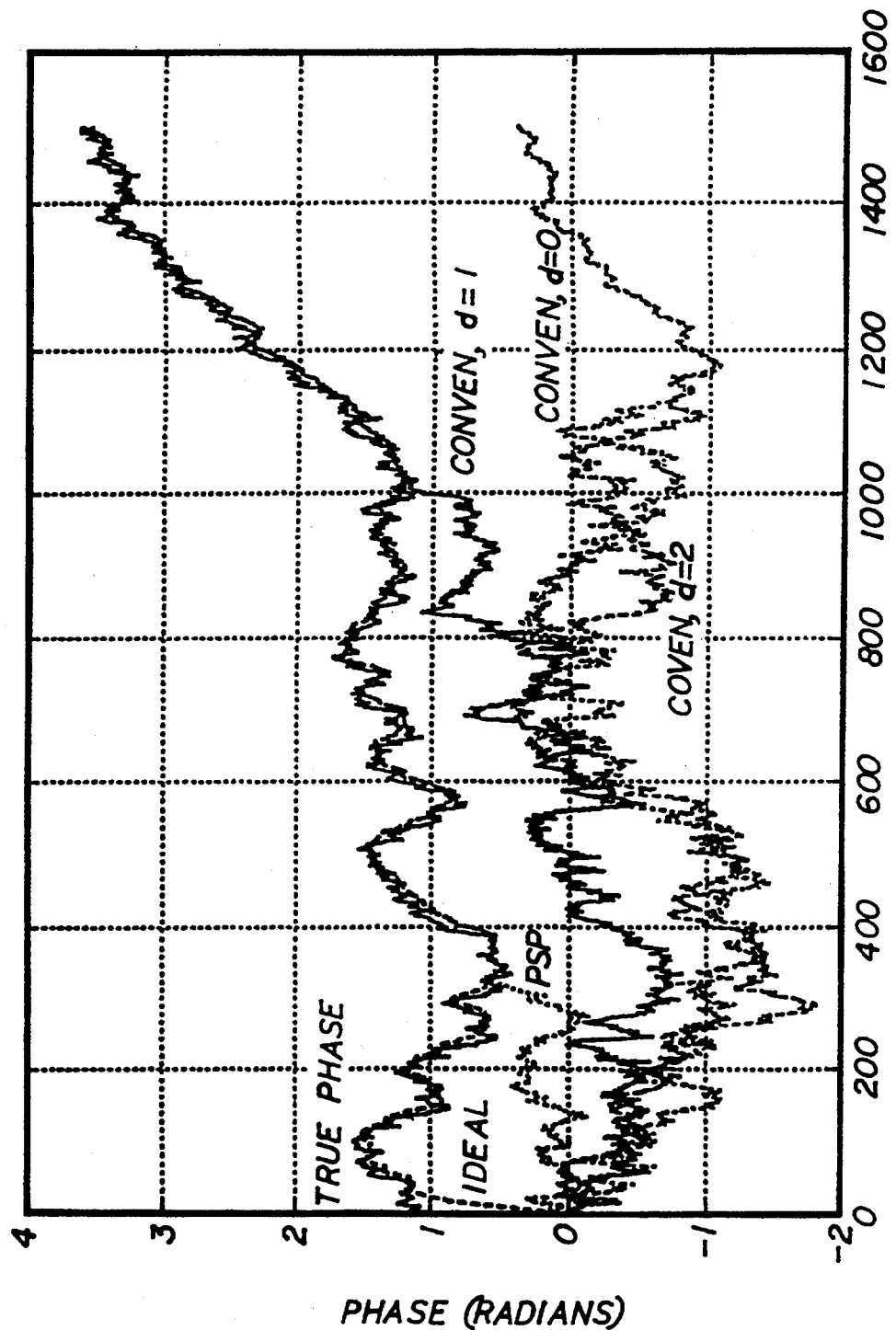
FIG. 11 illustrates phase acquisition trajectories.

The acquisition of the phase synchronizers is also considered. Table 2 shows the measurements of the acquisition time for the various systems averaged over 100 independent runs. In this test, the acquisition time is defined as the number of signaling intervals that are necessary for the difference between the estimated phase and the true channel phase to fall within a specified value. Specifically, this threshold is set to the tracking range of the S-curve of the estimator, namely $\pi/8$ [3]. This measurement is relative to an $E_s/N_0$ of 15 dB, a variance of the Gaussian increment in the channel phase process of 0.00125 $\text{rad}^2$, and $\eta=0.1$. An initial offset of 60 degrees between true and estimated phase is assumed. From the table, it is readily seen that the acquisition time of the PSP decoder is halved with respect to the conventional decoder independently of the used value of d. An example of typical phase trajectories of the various algorithms during this acquisition is shown in FIG. 11.

7. Conclusions

The invention provides methods for the approximation of MLSE based on the principle of performing signal processing operations, necessary for the estimation of unknown parameters, in a per-survivor fashion. Two general overlapping areas of application of PSP may be identified: reduction of the complexity of an MLSE decoder and data decoding in the presence of unknown channel parameters.

The fundamental characteristics of the PSP approach may be summarized as follows:

In a stationary environment, PSP-based MLSE systems are characterized by a considerable reduction of error propagation with respect to decoders that utilize tentative low-delay decisions for the estimation of the unknown parameters.

In a time-varying environment, zero-delay high-quality decisions are virtually available for data-aiding the parameter estimation process.

During the acquisition of the unknown channel parameters, many hypothetical data-aiding sequences are contemporarily utilized by the per-survivor estimators, with the result that the process is substantially facilitated.

As far as complexity is concerned, it is often true that the gain in performance achieved by a PSP system must be paid in terms of a more complex decoder. However, this is not true in general, as there are cases in which a PSP decoder exhibits reduced complexity and improved performance as it happens for long ISI channels.

Although the invention is described generally herein, a number of specific methods have been proposed to deal with several situations in which data decoding must be carried out in the presence of unknown, possibly time-varying channel parameters. As a matter of fact, in the case of unknown fast time-varying channels, PSP according to the invention provides a more structured approach both in terms of acquisition and tracking performance. There are many other applications of this concept, some of which are mentioned above in the introduction. As an example, other applications of the invention would be data decoding in the presence of fast time-varying unknown channel parameters.

Figure 12:
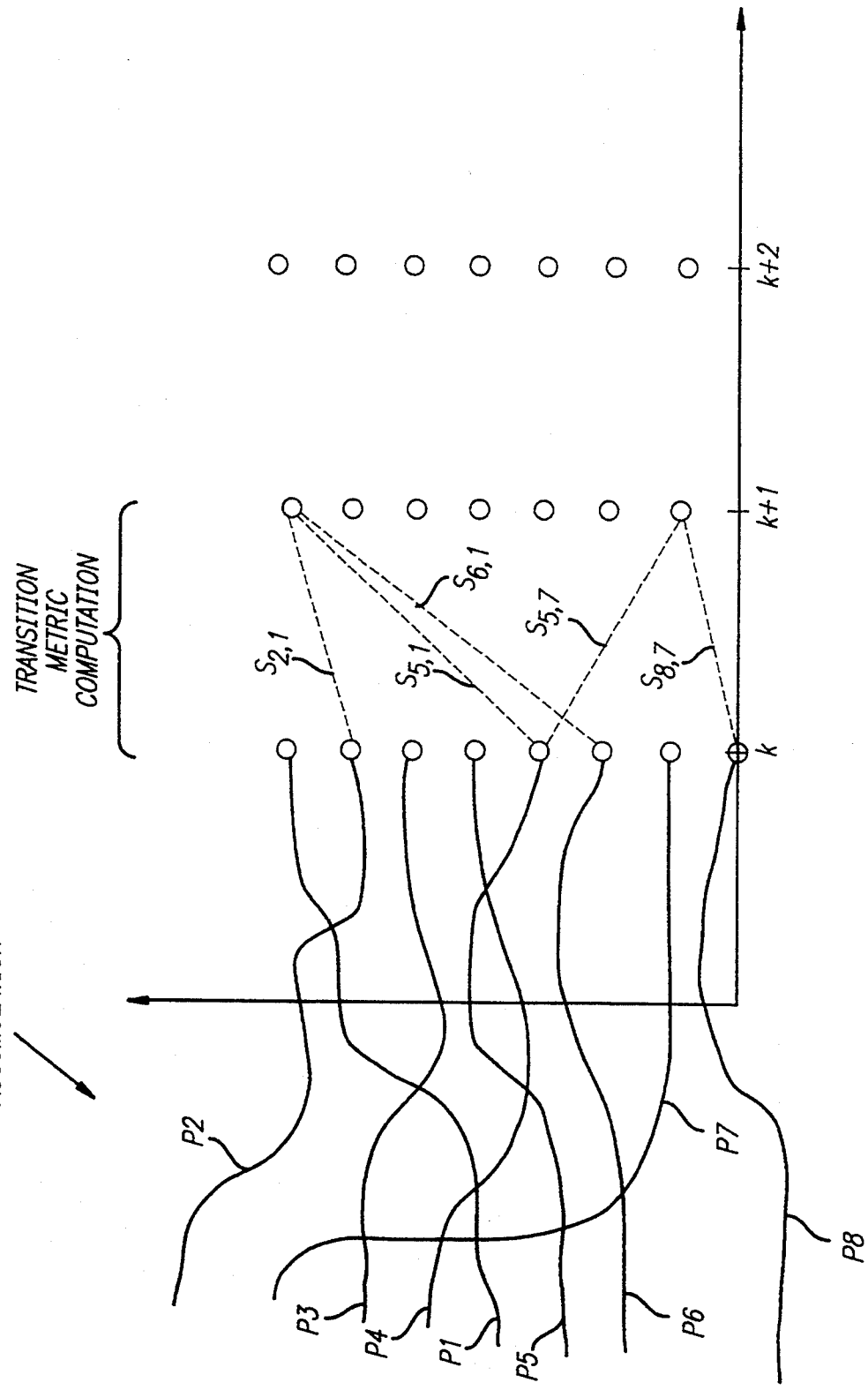
FIG. 12 illustrates a code trellis, as well as the concept of trellis decoding.

FIG. 12 illustrates a code trellis, as well as the concept of trellis decoding. In FIG. 12, data states, each of which will typically be multi-dimensional, are represented as small circles extending in vertical rows for each of three steps at times k, k+1 and k+2. At step k, eight possible data states are represented (the number of states will of course depend on the particular application), as well as eight associated survivors, each survivor being the data path or trajectory in state space leading to that particular state. Possible data paths (survivors) are illustrated by the lines $p_1, p_2, \ldots, p_8$. Associated with each possible data path $p_1, p_2, \ldots, p_8$ is its cumulative metrics history, which is accumulated and stored.

The problem faced by a decoding system is to decide which survivor (data state at time k+1 plus its associated state history or data trajectory and associated accumulated metric) is the most likely predecessor of each of the states at time k+1. In other words, for each "circle" at time k+1, the system must decide where the data most likely "came from" to get to that state. For example, viewing the topmost state (circle) at time k+1, one must therefore decide which circle at time k is its most likely predecessor.

In the most general case, every survivor (circle plus its "tail" $p_1-p_8$) at time k must be considered as a possible predecessor to each state at time k+1. Associated with each transition from a state at time k to a state at time k+1 there will be a metric, or measure of likelihood. The accumulation of all metrics for a particular survivor up to time k, plus the metric for the transition from that survivor to a state a time k+1 is the total or accumulated metric for that "choice" of survivor.

Let the transition from the survivor $p_i$ (illustrated as the i-th circle from the top at time k) to the state j (the j-th circle from the top at time k+1) be represented by the dashed line $s_{ij}$. Thus, in FIG. 12, the transition from $p_2$ (the state corresponding to the second circle from the top) at time k to the topmost state at time k+1 is indicated as the dashed line $s_{2,1}$ and the transition from survivor $p_8$ to state 7 is shown as the dashed line $s_{8,7}$.

In general, a transition metric is computed for each possible state transition $s_{ij}$, that is, for each possible pair of states going from time k to time k+1. On the other hand, in certain applications, one will know beforehand that certain transitions are not possible and the system will not need to compute and evaluate a transition metric for such a transition. For example, if one knows that the transmitted data sequence is such that a word with all zeros will never follow a data word with all ones, there is no need to consider a transition from a state with all ones to a state with all zeros. FIG. 12 illustrates a case in which one knows that the "uppermost" state at step k+1 could only have resulted from data paths (survivors) $p_2$, $p_5$, or $p_6$ (along with their corresponding states at time k).

Once the transition metrics are computed for each possible k to k+1 transition for each state at time k+1, the metric for each survivor up to time k is added to the metric for each transition associated with that survivor to come up with a cumulative metric value for each possible path (survivor up to time k plus transition from time k to time k+1) leading to each state at time k+1. The most likely predecessor survivor for each state at k+1 is then assumed to be the survivor with the highest accumulated metric and is chosen as the "best" survivor.

In order to compute transition metrics, however, one needs an estimate of the channel. In existing systems with a universal channel estimator, each transition metric is evaluated based on the single channel estimate. Assume by way of example that the single channel estimator system then selects $p_2$ (plus its corresponding state at time k and the associated accumulated metric up to time k) as the best survivor leading to state $s_1$ at time k+1. Since the channel estimator is universal, the channel estimate in place when $p_2$ is selected will not necessarily be close to the true channel value even for the selected survivor.

Figure 13:
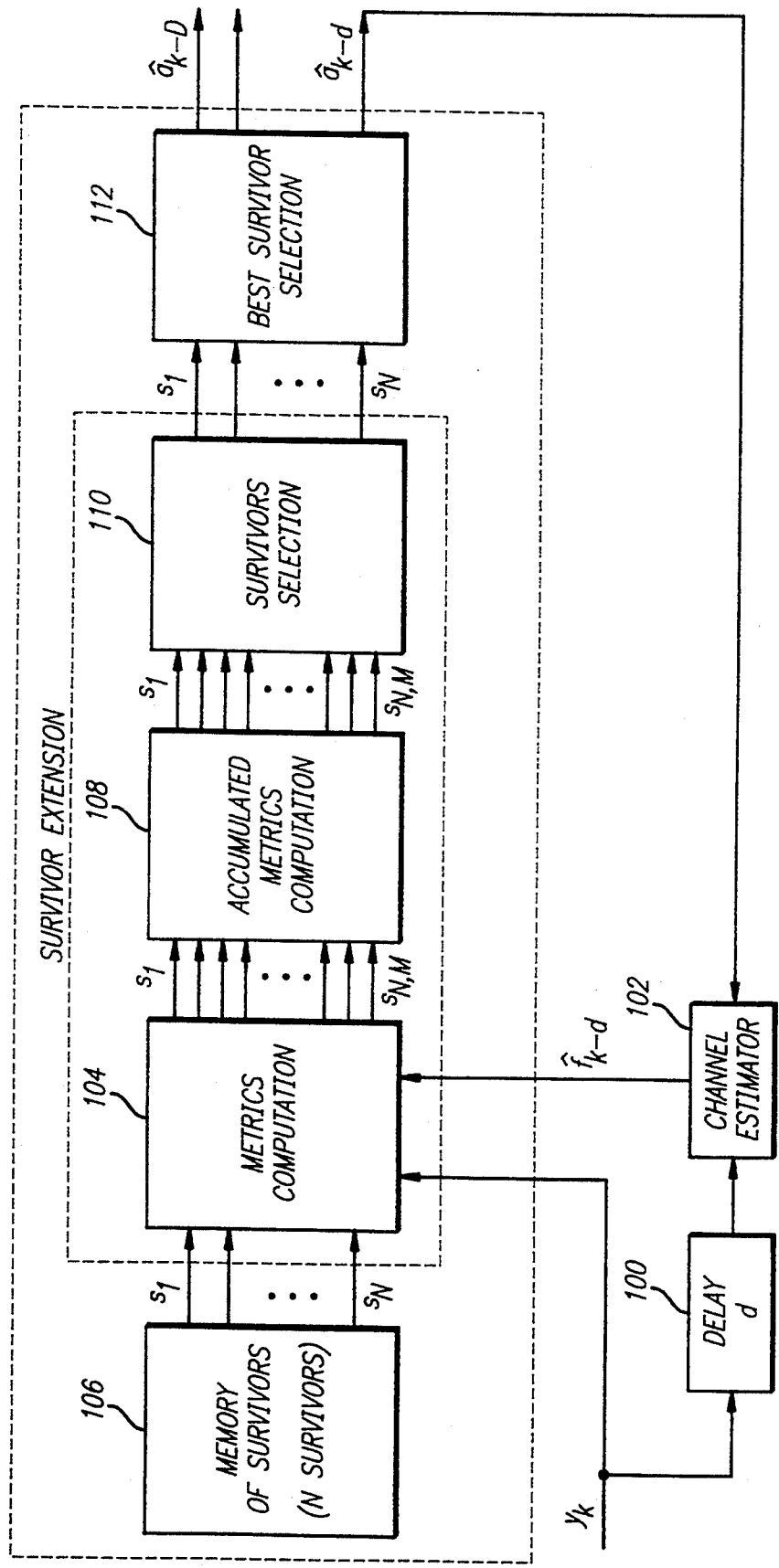
FIG. 13 illustrates the general structure of a conventional MLSE-based data sequence estimation system.

FIG. 13 illustrates the general structure of a conventional MLSE-based data sequence estimation system. In such a known system, an observed data sequence $y_k$ is delayed by a time d in a delay block 100 and is then fed to a channel estimator 102. The undelayed sequence $y_k$ is also applied to a metrics computation block 104, as is the channel estimate $f_{k-d}$ from the channel estimator 102.

Each of the N possible survivors $s_1, \ldots, s_N$ is stored in a survivor memory block 106, and is applied as an input signal to the metrics computation block 104. The metrics block 104 then computes the transition metrics $s_{1,1}, \ldots s_{1,M}, \ldots, s_{N,1}, \ldots, s_{N,M}$ for each possible transition, that is, for each possible state pair at time k and k+1. The associated computed metrics for all survivors are then applied to an accumulated metrics computation block 108, which computes and stores the cumulative metric value for each possible path to each state at k+1. Possible candidate survivors are selected in a known manner in a survivor selection block 110, from among which a "best" survivor is selected in a best survivor selection block 112. The best survivor selection block 112 simply selects the survivor with the optimum metric, such as the one survivor that indicates the data sequence closest to the observed data in an appropriate sense; this is described in greater detail above. The estimated source sequence $\hat{a}_{k-D}$ is then generated as the output.

As FIG. 13 illustrates, a tentatively estimated encoding sequence $\hat{a}_{k-d}$ (generated based on a delay $d<<D$) is also generated and is fed back as an input to the single channel estimator 102. The disadvantages of creating this delay d, and of having a single channel estimator 102, are explained above. To review, however, since the transition metrics are computed based on a "one-for-all" channel estimate, the metrics computations themselves will have inaccuracies resulting from the inherent faults of the single channel estimate, which cannot be optimal for all of two or more unequal survivors.

Figure 14:
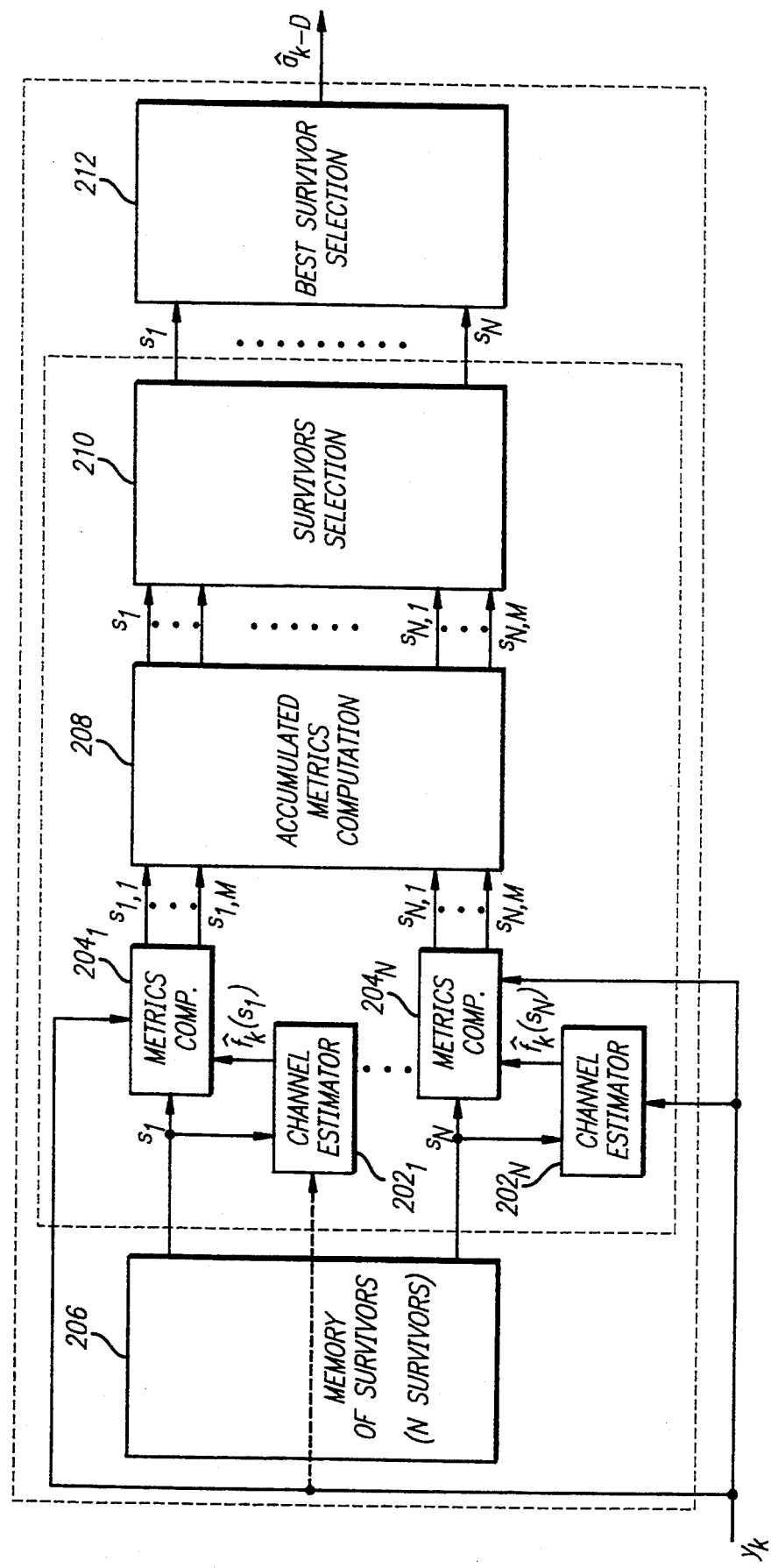
FIG. 14 is a block diagram that illustrates the per-survivor processing (PSP) system according to the invention.

FIG. 14 is a block diagram that illustrates the PSP system according to the invention. As in the conventional system, the system according to the invention includes a survivor memory block 206, an accumulated metrics computation block 208, a survivor selection block 210, and a best survivor selection block 212, which generates an estimated encoding sequence $\hat{a}_{k-d}$. According to the invention, however, instead of a single channel estimator 102 (see FIG. 13), a separate channel estimator $202_1, \ldots, 202_N$ is provided for each survivor $s_1, \ldots, s_N$. A corresponding separate metrics computation block $204_1, \ldots, 204_N$ is preferably also provided for each survivor, whereby metrics computation block i will compute all transition metrics for survivor i at time k to each state at time k+1, that is, $s_{i,1}, \ldots, s_{i,N}$, in the manner described above. The channel estimators $202_1, \ldots, 202_N$ compute estimates $f_k(s_1), \ldots, f_k(s_N)$ of the channel based on each individual survivor according to the method described above.

Comparing FIGS. 13 and 14, note that the system according to the invention does not require a delay block 100; rather, the undelayed observed data sequence $y_k$ is applied directly not only to the metrics computation blocks $204_1, \ldots, 204_N$, but also to each of the separate channel estimators $202_1, \ldots, 202_N$. Furthermore, note that the system according to the invention does not require feedback of a tentative encoding sequence $\hat{a}_{k-d}$ to any channel estimator 102. As a result, the system according to the invention does not suffer from the drawbacks of delayed estimation described above. An additional advantage of the invention is that, once the best survivor is selected, say $s_1$, the corresponding channel estimate $f_k(s_1)$ and metric $s_{1,1}, \ldots s_{1,M}$ (and accumulated metric) will already be available.

The metrics and accumulated metrics blocks $204_1, \ldots, 204_N$ and 208, respectively, the survivor selection block 210 and best survivor selection block 212, and the channel estimators $202_1, \ldots, 202_N$ may be implemented using any known technology that is sufficiently fast for the transmission medium and environment of a particular application. For example, separate microprocessors or dedicated processing circuitry may be used for each block or for predetermined groups of blocks (such as metrics computation and channel estimation for each survivor or survivor selection and best survivor selection) in order to increase speed. As long as the processor is sufficiently fast, however, a single processor may be used to implement the computation, estimation and selection blocks. The memory circuitry needed, for example, for the survivor memory block 206 and the accumulated metrics computation block 208 (to store cumulative values) may also be of any sufficiently fast conventional technology such as RAM memory circuits.

References

[1] G. D. Forney, "The Viterbi Algorithm." Proc. IEEE vol. 61, pp. 268–278. March 1973.

[2] G. D. Forney, "Maximum-Likelihood Sequence Estimation of Digital Sequences in the Presence of Intersymbol Interference," IEEE Trans. on Inform. Theory, vol. IT-18, May 1972.

[3] G. Ungerboeck, "Channel Coding with Multilevel/Phase Signals," IEEE Trans. on Inform. Theory, vol. IT-28, pp. 55–67, January 1982.

[4] P. R. Chevillat, E. Eleftheriou, "Decoding of Trellis-Encoded Signals in the Presence of Intersymbol Interference and Noise," IEEE Trans. Commun., vol. COM-37, pp. 669–676, July 1989.

[5] M. V. Eyuboğlu, S. U. H. Qureshi, "Reduced-State Sequence Estimation for Coded Modulation on Intersymbol Interference Channels," IEEE Journal Selected Areas in Commun., vol. 7, pp. 989–995, August 1989.

[6] J. G. Proakis, Digital Communications. New York: McGraw-Hill, 2nd ed., 1989.

[7] W. U. Lee, F. S. Hill, "A Maximum-Likelihood Sequence Estimator with Decision Feedback Equalization," IEEE Trans. on Commun, vol COM-25, pp. 971–979, September 1977.

[8] A. Polydoros "Maximum-Likelihood Sequence Estimation in the Presence of Infinite Intersymbol Interference" Master's Thesis, Graduate School of State University of New York at Buffalo, December 1978.

[9] A. Polydoros, D. Kazakos, "Maximum-Likelihood Sequence Estimation in the Presence of Infinite Intersymbol Interference," Conf. Rec. ICC'79, June 1979, pp. 25.2.1–25.2.5.

[10] K. Wesolowski, "Efficient Digital Receiver Structure for Trellis-Coded Signals Transmitted through Channels with Intersymbol Interference," Electronic Letters., vol. 23, No. 24, pp. 1265–1267, November 1987.

[11] J. W. M. Bergmans, S. A. Rajput, F. A. M. Van De Laar, "On the use of Decision Feedback for Simplifying the Viterbi Decoder," Philips Journal of Research, vol. 42, pp. 399–428, no. 4, 1987.

[12] A. D. Hallen, C. Heegard, "Delayed Decision-Feedback Sequence Estimation," IEEE Trans. Commun., vol. 37, pp. 428–436, May 1989.

[13] T. Hashimoto, "A List-Type Reduced-Constraint Generalization of the Viterbi Algorithm," IEEE Trans. Info. Theory, vol. IT-33, no.6, pp. 866–876, November 87.

[14] M. V. Eyuboğlu, S. U. H. Qureshi, "Reduced-State Sequence Estimation with Set Partition and Decision Feedback," IEEE Trans. Commun., vol. COM-36, pp. 13–20, January 1988.

[15] D. W. Lin, P. M. Crespo, "Receiver Optimization for Dispersive Channels Employing Coded Modulation with Application in High Rate Digital Subscriber Line Transmission," Conf. Rec. ICC'90, June 1990, Vol. 4, pp. 348.3.1–348.3.5.

[16] V. Joski, D. D. Falconer, "Sequence Estimation Techniques for Digital Subscriber Loop Transmission with Crosstalk Interference," IEEE Trans. on Commun, vol COM-38, pp. 1367–1374, September 1990.

[17] W. H. Sheen, G. L. Stuber "Error Probability for Reduced-State Sequence Estimation," Conf. Rec. ICC '91, pp. 43.1.1–43.1.5, June 1991.

[18] W. H. Sheen, G. L. Stuber "Error Probability of Reduced-State Sequence Estimation for Trellis-Coded Modulation on Intersymbol Interference Channels," Conf, Rec. GLOBECOM '91, pp. 33.1.1–33.1.6, December 1991.

*[19] A. Polydoros, R. Raheli, "The Principle of Per-Survivor Processing: A General Approach to Approximate and Adaptive ML Sequence Estimation," Communication Sciences Institute, University of Southern California, Technical Report CSI-90-07-05, July 1990; also presented at the Communication Theory Workshop, Rhodes, Greece, July 1991.

* A non-publically available internal technical report.

[20] R. Raheli, A. Polydoros, Ching-Kae Tzou, "The Principle of Per-Survivor Processing: A General Approach to Approximate and Adaptive MLSE," Conf. Rec. GLOBECOM '91, pp. 33.3.1–33.3.6, December 1991.

[21] A. J. Macdonald, J. B. Anderson, "PLL Synchronization for Coded Modulation," Conf. Rec. ICC '91, pp. 52.6.1–52.6.5, June 1991.

[22] A. Reichman, R. A. Scholtz, "Joint Phase Estimation and Data Decoding for TCM Systems," Proceedings of the First Intern. Symposium on Communication Theory and Application, 9—13 September 1991, Scotland, U.K..

[23] A. N. D'Andrea, U. Mengali, G. M. Vitetta, "Detection of Coded PSK Signals with Unknown Carrier Phase," Proceedings of the Fifth Intern. Workshop on Digital Communications, Tirrenia, Italy, pp. 413–422, September 1991.

[24] A. N. D'Andrea, U. Mengali, G. M. Vitetta, "Approximate ML Decoding of Coded PSK with no Explicit Carrier Phase Reference," submitted to the IEEE Trans. on Communications, April 1992.

[25] N. Seshadri, C. E. Sundberg, "Generalized Viterbi Algorithm for Error Detection with Convolutional Codes," Proceedings of GLOBECOM '89, pp. 43.3.1–43.3.5, 1989.

[26] J. Hagenauer89, P. Hoeher, "A Viterbi Algorithm with Soft-Decision Outputs and its Applications," Proceedings of GLOBECOM '89, pp. 47.1.1–47.1.7, 1989.

[27[ J. B. Anderson, S. Mohan, "Sequential Coding Algorithms: A Survey and Cost Analysis," IEEE Trans. Commun., vol. COM-32, no. 2, pp. 169–176, February 1984.

[28] N. Seshadri, J. B. Anderson "Decoding of Severely Filtered Modulation Codes Using the (M,L) Algorithm," *IEEE Journal Selected Areas in Commun.*, vol. 7, no. 6, pp. 1006-1016, August 1989.

[29] S. J. Simmons, "Breadth-First Trellis Decoding with Adaptive Effort," *IEEE Trans. Commun.*, vol. 38, no. 1, pp. 3-12, January 1990.

[30] J. B. Anderson, S. Mohan, *Source and Channel Coding*. Boston: Kluwer Academic Publishers. 1991.

[31] N. Seshadri, "Joint Data and Channel Estimation Using Blind Trellis Search Techniques," submitted to the IEEE Trans. on Comm.

[32] G. Ungerboeck, "Adaptive Maximum-Likelihood Receiver for Carrier Modulated Data-Transmission Systems" *IEEE Trans. Commun.*, vol. COM-22, pp. 624-636, May 1974.

[33] P. Monsen, "Feedback Equalization for Fading Dispersive Channels," *IEEE Trans. Inform. Theory*, pp. 56-64, January 1971.

[34] R. Price, "Nonlinearly Feedback-Equalized PAM vs. Capacity for Noisy Filter Channels," *Conf. Rec. ICC '72*, pp.22.12-22.17, June 1972.

[35] F. R. Magee, Jr., J. G. Proakis, "Adaptive Maximum-Likelihood Sequence Estimation for Digital Signaling in the Presence of Intersymbol Interference," *IEEE Trans. on Inform. Theory*, vol. IT-19, pp.120-124 1973.

[36] S. U. H. Qureshi, E. E. Newhall, "An Adaptive Receiver for Data Transmission over Time-Dispersive Channels," *IEEE Trans. Inform. Theory*, vol. IT-19, pp. 448-457, July 1973.

[37] D. G. Messerchmitt, "Design Issues in the ISDN U-Interface Transceiver," *IEEE Journal on Selected Areas in Communications*, vol. 4, pp.1281-1293, November 1986.

[38] D. W. Lin, "Wide-Band Digital Subscriber Access with Multidimensional Block Modulation and Decision-Feedback Equalization," *IEEE Journal on Selected Areas in Communications*, vol. 7, pp. 996-1005, August 1989.

[39] P. M. Crespo and M. L. Honig, "Pole-Zero Derision Feedback Equalization with a Rapidly Converging Adaptive IIR Algorithm," *IEEE Journal Selected Areas in Commun.*, vol. 9, pp. 817-829, August 1991.

[40] J. J. Shynk, "Adaptive IIR Filtering", *IEEE ASSP Magazine*, vol. 6, No.2, pp. 4-21, April 1989.

[41] S. U. Qureshi, "Adaptive Equalization", *Proc. IEEE*, vol. 73, pp.1349-1387, September 1985.

[42] H. Kobayashi, "Simultaneous Adaptive Estimation and Decision Algorithm for Carrier Modulated Data Transmission Systems," *IEEE Trans. Commun.*, vol. COM-19, pp. 268-280, June 1971.

[43] E. Eleftheriou and D. D. Falconer, "Tracking Properties and Steady-state Performance of RLS Adaptive Filter Algorithms," IEEE Trans. on ASSP, Vol. 34, pp. 1097-1109, 1986.

[44] B. Widrow and et,al, "Stationary and Non-stationary Learning Characteristics of the LMS Adaptive Filter," Proc. IEEE, Vol-64, pp.1151-1162, August 1976.

TABLE 1

Average acquisition time in symbol intervals for adaptive MLSE based on MSE channel identification

| $E_s/N_0$ | IDEAL | PSP | CONVENTIONAL | | | | | | |
|---|---|---|---|---|---|---|---|---|---|
| | | | d = 0 | d = 2 | d = 4 | d = 10 | d = 20 | d = 30 | d = 40 |
| 33 dB | 316 | 3624 | 0% | 0% | 0% | 54641 (19%) | 27559 | 23234 | 25730 |
| 38 dB | 340 | 2983 | 0% | 0% | 0% | 47028 (32%) | 27131 | 22838 | 23360 |

TABLE 2

Average acquisition time in symbol intervals for joint TCM decoding and phase synchronization

| IDEAL | PSP | CONVENTIONAL | | | |
|---|---|---|---|---|---|
| | | d = 0 | d = 1 | d = 2 | d = 4 |
| 17.92 | 361.16 | 864.97 | 588.71 | 925.27 | 877.63 |

We claim:

1. A system for estimating data sequences in digital transmissions, with a transmission channel and a received observed digital signal $y_k$ comprising:

a survivor memory circuit for storing a digital representation of each of a plurality of N possible data paths as a sequence of N initial survivor sequences $s_1, \ldots, s_N$, where N is an integer;

for each initial survivor sequence, an individual channel estimator;

for each initial survivor sequence, an individual transition metrics computation circuit for computing a transition metric from the initial survivor sequence at a time k to each of a plurality of data states at a time k+1;

an accumulated metrics computation circuit for cumulatively computing and storing accumulated metrics for each initial survivor sequence plus each associated transition metric up to time k+1;

a survivor selection circuit for selecting candidate survivor sequences from among the initial survivor sequences stored in the accumulated metrics computation circuit;

a best survivor circuit for selecting and transmitting as an estimated encoding sequence $\hat{a}_{k-D}$ corresponding to a most likely estimate of an actually transmitted data sequence;

in which:

each channel estimator has an inputs the corresponding initial survivor sequence and the observed digital signal $y_k$ and has as an output signal a channel estimate signal corresponding to an estimate of the transmission channel as a predetermined function only of the corresponding initial survivor sequence and the observed digital signal;

each metrics computation circuit has as inputs the corresponding initial survivor sequence, the corresponding channel estimate signal, and the observed digital signal $y_k$ and has as outputs transition metrics computation signals corresponding to the input initial survivor sequence;

the accumulated metrics computation circuit has as inputs the metrics computation signals from all of the metrics computation circuits and has as outputs accumulated metrics signals;

the survivor selection circuit has as inputs the accumulated metrics signals and has as outputs the N candidate survivor signals;

the best survivor selection circuit has as inputs the N candidate survivor signals and has as an output the estimated encoding sequence $\hat{a}_{k-D}$;

whereby metrics computation is performed independently for each initial survivor sequence using the separate channel estimators for each survivor.

2. A method for estimating data sequences in digital transmissions, with a transmission channel and a received observed digital signal $y_k$, comprising the following steps:

storing a digital representation of each of a plurality of N possible data paths as a sequence of N initial survivor sequences $s_1, \ldots, s_N$, where N is an integer;

for each initial survivor sequence, individually and separately computing a channel estimate of the transmission channel as a predetermined function only of the corresponding initial survivor sequence and the observed digital signal;

for each initial survivor sequence, individually and separately computing a survivor transition metric from the initial survivor sequence at a time k to each of a plurality of data states at a time k+1;

computing and storing an accumulated survivor metric for each of a plurality of possible transition metrics from the initial survivor sequence at time k to each data state at time k+1;

selecting the N best survivor candidate sequences from among the initial survivor sequences; and selecting and transmitting as an estimated encoding sequence $â_{k-D}$ a best survivor sequence corresponding to a most likely estimate of an actually transmitted data sequence.

3. The system for estimating data sequences in digital transmissions of claim 1, wherein the received observed digital signal $y_k$ is obtained from a single antenna.

4. A system for estimating data sequences in digital transmissions, with a transmission channel and a received observed digital signal $y_k$ comprising:

a survivor memory circuit for storing each of a plurality of possible data paths as a sequence of N initial survivor sequences $s_1, \ldots, s_N$, where N is an integer;

a plurality of N individual channel estimators;

a plurality of N individual transition metrics computation circuits, wherein each individual transition metrics computation circuit computes a transition metric from the initial survivor sequence at a time k to each of a plurality of data states at a time k+1;

an accumulated metrics computation circuit for computing and storing accumulated metrics for each initial survivor sequence and each associated transition metric up to time k+1;

a survivor selection circuit for selecting new and updated candidate survivor sequences based on the initial survivor sequences and the accumulated metrics associated to each possible state transition stored in the accumulated metrics computation circuit for each of the plurality of possible data paths;

a best survivor circuit for selecting and outputting a most likely estimate of an actually transmitted data sequence, wherein each channel estimator receives the corresponding initial survivor sequence and the observed digital signal y, and transmits a channel estimate signal corresponding to an estimate of the transmission channel as a predetermined function only of the corresponding initial survivor sequence and the observed digital signal.

5. The system for estimating data sequences in digital transmissions of claim 4, wherein the received observed digital signal $y_k$ is obtained from a single antenna.

6. The system for estimating data sequences in digital transmissions of claim 4, wherein metrics computation is performed independently for each initial survivor sequence using the separate channel estimators for each survivor.

7. The system for estimating data sequences in digital transmissions of claim 6, wherein each metrics computation circuit receives the corresponding initial survivor sequence, the corresponding channel estimate signal, and the observed digital signal $y_k$ and transmits transition metrics computation signals corresponding to the input initial survivor sequence.

8. The system for estimating data sequences in digital transmissions of claim 7, wherein the accumulated metrics computation circuit receives the metrics computation signals from all of the metrics computation circuits plus all previously accumulated metrics signals and has as outputs new accumulated metrics signals.

9. The system for estimating data sequences in digital transmissions of claim 8, wherein the survivor selection circuit receives the new accumulated metrics signals and transmits new N candidate survivor signals.

10. The system for estimating dam sequences in digital transmissions of claim 9, wherein the best survivor selection circuit receives the N candidate survivor signals and transmits the estimated encoding sequence.

11. The system for estimating data sequences in digital transmissions of claim 10, wherein metrics computation is performed independently for each initial survivor sequence using channel estimators for each survivor, and each channel estimator of each selected initial node is updated using the new and updated candidate survivor signals thereby becoming a new channel estimator associated with that node.

12. A method for estimating data sequences in digital transmissions, with a transmission channel and a received observed digital signal $y_k$, comprising the following steps:

storing a digital representation of each of a plurality of N possible data paths as a sequence of N initial survivor sequences $s_1, \ldots, s_N$, where N is an integer;

for each initial survivor sequence, individually and separately computing a channel estimate of the transmission channel as a predetermined function only of the corresponding initial survivor sequence and the observed digital signal;

for each initial survivor sequence at a time k and each possible transition to a plurality of data states at a time k+1, determining a candidate channel estimator using a data sequence from a corresponding candidate survivor path;

for each initial survivor sequence, individually and separately computing a survivor transition metric from the initial survivor sequence at time k to each of a plurality of data states at time k+1 using the candidate channel estimator from said determining step;

computing and storing an accumulated survivor metric for each of a plurality of possible transition metrics from the initial survivor sequence at time k to each data state at time k+1;

selecting a new N best survivor candidate sequences based on the N initial survivor sequences and the accumulated survivor metrics from among the initial survivor sequences; and selecting and outputting as an estimated encoding sequence $â_{k-D}$ a best survivor sequence corresponding to a most likely estimate of an actually transmitted data sequence.

* * * * *